US012219635B2

(12) United States Patent
Da Silva et al.

(10) Patent No.: US 12,219,635 B2
(45) Date of Patent: Feb. 4, 2025

(54) CONDITIONAL CONFIGURATION IN MULTI-CONNECTIVITY OPERATION

(71) Applicant: Telefonaktiebolaget LM Ericsson (publ), Stockholm (SE)

(72) Inventors: Icaro Leonardo Da Silva, Solna (SE); Mattias Bergström, Sollentuna (SE); Cecilia Eklöf, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 383 days.

(21) Appl. No.: 17/772,778

(22) PCT Filed: Oct. 28, 2020

(86) PCT No.: PCT/SE2020/051044
§ 371 (c)(1),
(2) Date: Apr. 28, 2022

(87) PCT Pub. No.: WO2021/086254
PCT Pub. Date: May 6, 2021

(65) Prior Publication Data
US 2022/0408325 A1  Dec. 22, 2022

Related U.S. Application Data

(60) Provisional application No. 62/927,072, filed on Oct. 28, 2019.

(51) Int. Cl.
*H04W 76/15* (2018.01)
*H04W 36/00* (2009.01)

(52) U.S. Cl.
CPC ........ *H04W 76/15* (2018.02); *H04W 36/0064* (2023.05); *H04W 36/0069* (2018.08)

(58) Field of Classification Search
CPC ............. H04W 76/15; H04W 36/0064; H04W 36/0069; H04W 36/08; H04W 36/18;
(Continued)

(56) References Cited

U.S. PATENT DOCUMENTS

2019/0223073 A1* 7/2019 Chen ................. H04W 36/0079
2020/0396652 A1* 12/2020 Decarreau ......... H04W 36/0033
(Continued)

FOREIGN PATENT DOCUMENTS

DE    202005014249 U1   2/2006
WO    2019096396 A1     5/2019
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.7.0, Sep. 2019, 1-295.
(Continued)

*Primary Examiner* — Nimesh Patel
(74) *Attorney, Agent, or Firm* — Murphy, Bilak & Homiller, PLLC

(57) ABSTRACT

A method performed by a wireless device (18) comprises receiving (250), from a master node (12A) for multi-connectivity operation, a configuration message (20) which includes a master configuration (28) and one or more conditional PSCell configurations (22). The method also comprises transmitting (260) a first message (26) in response to the configuration message (20). The first message (26) indicates acknowledgement of receipt, applying of, and/or understanding of the master configuration (28). The method also comprises, after transmitting (260) the first message (26), when the condition for applying the PSCell configu-
(Continued)

ration (22) of at least one of the one or more conditional PSCell configurations (22) is fulfilled, transmitting (270), to the master node (12A), a second message (30) that includes an indication (24) indicating application by the wireless device (18) of the PSCell configuration (22) of at least one of the one or more PSCell configurations (22).

26 Claims, 23 Drawing Sheets

(58) Field of Classification Search
CPC ... H04W 36/14; H04W 80/00; H04W 84/005; H04W 88/08; H04W 16/10; H04W 92/02; H04W 28/18; H04W 36/24; H04W 36/0072; H04W 72/04; H04W 74/00; H04W 76/10; H04W 36/0005; H04W 36/00837; H04W 84/12; H04W 36/0085; H04W 36/00835; H04M 1/72412; H04M 1/72403; H04M 11/06; H04M 2207/18; H04M 2203/1091; H04M 2250/06; H04M 7/00; H04J 11/0056; H04J 11/0069; H04J 11/00

See application file for complete search history.

(56) References Cited

U.S. PATENT DOCUMENTS

2020/0404563 A1\* 12/2020 Wu ................... H04W 36/36
2022/0070740 A1\* 3/2022 Futaki ............... H04W 36/0077

FOREIGN PATENT DOCUMENTS

WO 2019179316 A1 9/2019
WO 2020193626 A1 10/2020

OTHER PUBLICATIONS

3GPP, "3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.7.0, Sep. 2019, 1-70.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.7.0, Sep. 2019, 1-962.

3GPP, "3rd Generation Partnership Project; Technical Specification Group Radio Access Network; NR; Radio Resource Control (RRC) protocol specification (Release 15)", 3GPP TS 38.331 V15.7.0, Sep. 2019, 1-527.

Ericsson, "TP for 38.331 on CHO", 3GPP TSG-RAN WG2 #107bis, R2-1912636, Chongqing, P.R. China, Oct. 14-18, 2019, 1-30.

Intel Corporation, "Running CR for the introduction of NR mobility enhancement", 3GPP TSG-RAN WG2 Meeting #107bis, R2-1912781, Chongqing, China, Oct. 14-18, 2019, 1-19.

\* cited by examiner

CONDITIONAL CONFIGURATION IN MULTI-CONNECTIVITY OPERATION

TECHNICAL FIELD

The present application relates generally to multi-connectivity operation in a wireless communication network, and relates more particularly to conditional configuration in the context of such multi-connectivity operation.

BACKGROUND

Robustness of mobility and multi-connectivity procedures to failure proves challenging particularly in New Radio (NR) systems whose radio links are more prone to fast fading due to their higher operating frequencies. Conditional configuration is one approach to improve robustness in this regard. Under this approach, a wireless device may be commanded to apply a configuration, e.g., multi-connectivity configuration, earlier than traditionally commanded. But the wireless device is commanded to wait to apply that configuration until the wireless device detects that a certain condition is fulfilled. Once the device detects that condition, the device may autonomously apply the configuration without receiving any other signaling on the source radio link, e.g., so that the procedure proves robust to changing channel conditions.

These and other types of conditional configurations nonetheless threaten to increase signaling overhead, delay configuration application, and/or trigger unnecessary procedures.

SUMMARY

According to some embodiments herein, a wireless device receives, from a master node for multi-connectivity operation, a configuration message which includes one or more conditional PSCell configurations. When the condition for applying the PSCell configuration of at least one of the one or more conditional PSCell configurations is fulfilled, the wireless device transmits, to the master node, an indication that the wireless device has applied the PSCell configuration of at least one of the one or more conditional PSCell configurations. Upon receiving the indication, the master node may transmit a message to a secondary node associated with a different one of the one or more conditional PSCell configurations whose PSCell configuration the wireless device has not applied. The message may for instance cancel the different one of the one or more conditional PSCell configurations.

In some embodiments, this involves the wireless device deferring transmitting the indication until fulfillment of the condition for at least one of the one or more conditional PSCell configurations. The wireless device may for example transmit in response to the configuration message a first message that acknowledges receipt, application, and/or understanding of a master node configuration included in the configuration message. Then, later, once the condition for at least one of the one or more conditional PSCell configurations is fulfilled, the wireless device may transmit a second message including the indication that indicates that the wireless device has applied the PSCell configuration of at least one of the one or more conditional PSCell configurations. This advantageously avoids delaying the first message, while still allowing for the indication to be sent later in a second message.

In other embodiments, though, the wireless device may nonetheless send the indication already in the first message if the condition for at least one of the one or more conditional PSCell configurations has already been fulfilled when the configuration message is received. This maximizes transmission efficiency in terms of resources.

More particularly, embodiments herein include a method performed by a wireless device. The method comprises receiving, from a master node for multi-connectivity operation, a configuration message which includes a master configuration and one or more conditional PSCell configurations. In this case, the master configuration is associated with the master node, each conditional PSCell configuration comprises a PSCell configuration that the wireless device is to apply when an associated condition is fulfilled, and each PSCell configuration is a configuration of a primary cell of a secondary cell group associated with a secondary node for multi-connectivity operation. The method also comprises transmitting a first message in response to the configuration message. In this case, the first message indicates acknowledgement of receipt, applying of, and/or understanding of the master configuration. The method also comprises, after transmitting the first message, when the condition for applying the PSCell configuration of at least one of the one or more conditional PSCell configurations is fulfilled, transmitting, to the master node, a second message that includes an indication indicating application by the wireless device of the PSCell configuration of at least one of the one or more PSCell configurations.

In some embodiments, the method also comprises, responsive to receiving the configuration message, evaluating whether the condition for at least one of the one or more conditional PSCell configurations is fulfilled. The method also comprises identifying whether the configuration message includes the master configuration, and determining, based on said evaluating and said identifying, whether to transmit the first message in response to the configuration message. In this case, according to determining whether to transmit the first message, the first message is transmitted based on identifying that the configuration message includes the master configuration and based on evaluating that the condition has not been fulfilled for any of the one or more conditional PSCell configurations.

In some embodiments, the first message lacks Layer 2 acknowledgement of the configuration message.

In some embodiments, the first message is a first Radio Resource Control, RRC, Reconfiguration Complete message or a first RRC Connection Reconfiguration Complete message.

In some embodiments, the second message is a second Radio Resource Control, RRC, Reconfiguration Complete message or a second RRC Connection Reconfiguration Complete message.

In some embodiments, the indication indicates which PSCell configuration the wireless devices has applied.

In some embodiments, each conditional PSCell configuration comprises either a conditional PSCell change configuration or a conditional PSCell addition configuration.

In some embodiments, the method further comprises, when the condition for applying the PSCell configuration of at least one of the one or more conditional PSCell configurations is fulfilled, applying the PSCell configuration of at least one of the one or more conditional PSCell configurations, wherein the indication included in the second message indicates that the wireless device has applied the PSCell configuration of at least one of the one or more conditional PSCell configurations.

Other embodiments herein include a method performed by a radio network node acting as a master node for multi-connectivity operation. The method comprises transmitting, from the master node to a wireless device, a configuration message which includes a master configuration and one or more conditional PSCell configurations. In this case, the master configuration is associated with the master node, each conditional PSCell configuration comprises a PSCell configuration that the wireless device is to apply when an associated condition is fulfilled, and each PSCell configuration is a configuration of a primary cell of a secondary cell group associated with a secondary node for multi-connectivity operation. The method also comprises receiving, from the wireless device, a first message in response to the configuration message, wherein the first message indicates acknowledgement of the receipt, applying of, and/or understanding of the master configuration. The method also comprises after receiving the first message, receiving, from the wireless device, a second message that includes an indication indicating application by the wireless device of the PSCell configuration of at least one of the one or more conditional PSCell configurations.

In some embodiments, the applied indication is not received until fulfillment of the condition for at least one of the one or more conditional PSCell configurations.

In some embodiments, the first message lacks Layer 2 acknowledgement of the configuration message.

In some embodiments, the first message is a first Radio Resource Control, RRC, Reconfiguration Complete message or a first RRC Connection Reconfiguration Complete message.

In some embodiments, the second message is a second Radio Resource Control, RRC, Reconfiguration Complete message or a second RRC Connection Reconfiguration Complete message.

In some embodiments, the applied indication indicates which of the one or more conditional PSCell configuration the wireless devices has applied.

In some embodiments, each conditional PSCell configuration comprises either a conditional PSCell change configuration or a conditional PSCell addition configuration.

In some embodiments, the method further comprises responsive to receiving the second message including the indication indicating application by the wireless device of the PSCell configuration of at least one of the one or more conditional PSCell configurations, transmitting a message to a secondary node associated with a different one of the one or more conditional PSCell configurations whose PSCell configuration the wireless device has not applied. In this case, the message indicates that the wireless device has not applied the PSCell configuration of the different one of the one or more conditional PSCell configurations and/or cancels the different one of the one or more conditional PSCell configurations.

In some embodiments, the method further comprises forwarding the second message to a secondary node associated with the at least one of the one or more conditional PSCell configurations whose PSCell configuration is indicated by the applied indication as being applied by the wireless device.

Other embodiments herein include a wireless device for multi-connectivity operation. The wireless device is configured to receive, from a master node for multi-connectivity operation, a configuration message which includes a master configuration and one or more conditional PSCell configurations. In this case, the master configuration is associated with the master node, each conditional PSCell configuration comprises a PSCell configuration that the wireless device is to apply when an associated condition is fulfilled, and each PSCell configuration is a configuration of a primary cell of a secondary cell group associated with a secondary node for multi-connectivity operation. The wireless device is also configured to transmit a first message in response to the configuration message. In this case, the first message indicates acknowledgement of receipt, applying of, and/or understanding of the master configuration. The wireless device is also configured to after transmitting the first message, when the condition for applying the PSCell configuration of at least one of the one or more conditional PSCell configurations is fulfilled, transmit, to the master node, a second message that includes an indication indicating application by the wireless device of the PSCell configuration of at least one of the one or more conditional PSCell configurations.

In some embodiments, the wireless device is configured to perform the steps described above for a wireless device.

Other embodiments herein include a radio network node configurable to act as a master node for multi-connectivity operation. The radio network node is configured to transmit, from the master node to a wireless device, a configuration message which includes a master configuration and one or more conditional PSCell configurations. In this case, the master configuration is associated with the master node, each conditional PSCell configuration comprises a PSCell configuration that the wireless device is to apply when an associated condition is fulfilled, and each PSCell configuration is a configuration of a primary cell of a secondary cell group associated with a secondary node for multi-connectivity operation. The radio network node is also configured to receive, from the wireless device, a first message in response to the configuration message. In this case, the first message indicates acknowledgement of the receipt, applying of, and/or understanding of the master configuration. The radio network node is also configured to after receiving the first message, receive, from the wireless device, a second message that includes an indication indicating application by the wireless device of the PSCell configuration of at least one of the one or more conditional PSCell configurations.

In some embodiments, the radio network node is configured to perform the steps described above for a radio network node.

Other embodiments herein include a computer program comprises instructions which, when executed by at least one processor of a wireless device, causes the wireless device to perform the steps described above for a wireless device. Other embodiments herein include a computer program comprises instructions which, when executed by at least one processor of a radio network node, causes the radio network node to perform the steps described above for a radio network node. In one or more of these embodiments, the carrier is one of an electronic signal, optical signal, radio signal, or computer readable storage medium.

Other embodiments herein include a wireless device for multi-connectivity operation. The wireless device comprises communication circuitry and processing circuitry. The processing circuitry is configured to receive, from a master node for multi-connectivity operation, a configuration message which includes a master configuration and one or more conditional PSCell configurations. In this case, the master configuration is associated with the master node, each conditional PSCell configuration comprises a PSCell configuration that the wireless device is to apply when an associated condition is fulfilled, and each PSCell configuration is a configuration of a primary cell of a secondary cell group associated with a secondary node for multi-connectivity operation. The processing circuitry is also configured to transmit a first message in response to the configuration message. In this case, the first message indicates acknowledgement of receipt, applying of, and/or understanding of the master configuration. The processing circuitry is also configured to after transmitting the first message, when the condition for applying the PSCell configuration of at least one of the one or more conditional PSCell configurations is fulfilled, transmit, to the master node, a second message that includes an indication indicating application by the wireless device of the PSCell configuration of at least one of the one or more conditional PSCell configurations.

In some embodiments, the processing circuitry is configured to perform the steps described above for a wireless device.

Other embodiments herein include a radio network node configurable to act as a master node for multi-connectivity operation. The radio network node comprises communication circuitry and processing circuitry. The processing circuitry is configured to transmit, from the master node to a wireless device, a configuration message which includes a master configuration and one or more conditional PSCell configurations. In this case, the master configuration is associated with the master node, each conditional PSCell configuration comprises a PSCell configuration that the wireless device is to apply when an associated condition is fulfilled, and each PSCell configuration is a configuration of a primary cell of a secondary cell group associated with a secondary node for multi-connectivity operation. The processing circuitry is configured to receive, from the wireless device, a first message in response to the configuration message. In this case, the first message indicates acknowledgement of the receipt, applying of, and/or understanding of the master configuration. The processing circuitry is also configured to after receiving the first message, receive, from the wireless device, a second message that includes an indication indicating application by the wireless device of the PSCell configuration of at least one of the one or more conditional PSCell configurations.

In some embodiments, the processing circuitry is configured to perform the steps described above for a radio network node.

DETAILED DESCRIPTION

Figure 1:
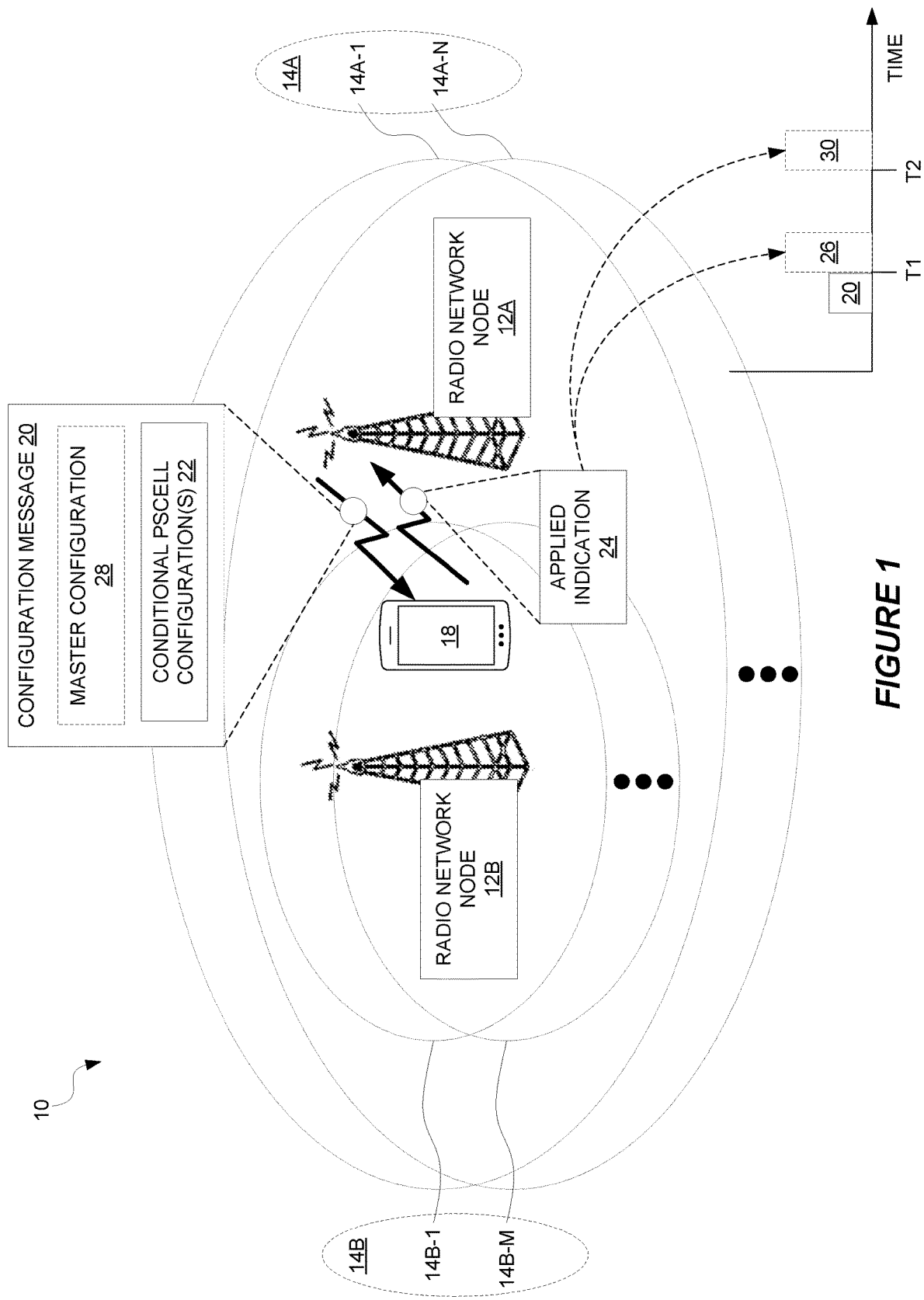
FIG. 1 is a block diagram of a wireless communication network according to some embodiments.

FIG. 1 shows a wireless communication network 10 according to some embodiments. The network 10 as shown includes radio network nodes 12A and 12B, e.g., in the form of base stations. The radio network nodes 12A and 12B may be included in a radio access network (RAN) portion of the network 10, which may in turn connect to a core network (CN) portion (not shown).

Each radio network node 12A, 12B serves one or more cells. As shown, for example, a first radio network node 12A provides a first cell group 14A that includes N cells 14A-1, ... 14A-N, for N≥1. A second radio network node 12B provides a second cell group 14B that includes M cells 14B-1, ... 14B-M, for M≥1. Different cells may for instance be provided on different carrier frequencies, with different frequency bandwidths, and/or using different radio access technologies.

In some embodiments, a wireless device 18 is configured with and/or capable of multi-connectivity operation. In multi-connectivity operation, the wireless device 18 simultaneously connects, e.g., at a radio resource control, RRC, layer, to multiple different radio network nodes 12A, 12B, or to multiple different cells served by different radio network nodes 12A, 12B. The multiple different radio network nodes or cells may use the same radio access technology, e.g., both may use Evolved Universal Terrestrial Radio Access (E-UTRA) or both may use New Radio (NR). Or, the multiple different radio network nodes or cells may use different radio access technologies, e.g., one may use E-UTRA and another may use NR.

One example of multi-connectivity is dual connectivity (DC) in which the wireless device 18 is simultaneously connected to two different radio network nodes, or to two different cells served by two different radio network nodes. In this case, the wireless device 18 may be configured with a so-called master cell group (MCG) and a secondary cell group (SCG). Here, the MCG includes one or more cells served by the radio network node acting as a master node, i.e., a group of serving cells associated with the master node. The MCG may include a primary cell and optionally one or more secondary cells. The primary cell of the MCG is referred to as a PCell. The SCG includes one or more cells served by the radio network node acting as a secondary node, i.e., a group of serving cells associated with the secondary node. The SCG may include a primary cell and optionally one or more secondary cells. The primary cell of the SCG is referred to as the PSCell.

The master node may be a master in the sense that it controls the secondary node. Alternatively or additionally, the master node may be a master in the sense that it is a radio access node that provides the control plane connection for the wireless device 18 to the core network, whereas the secondary node lacks a control plane connection for the wireless device 18 to the core network.

Different types of dual connectivity may be employed by different embodiments. In some embodiments, the wireless device 18 operates with E-UTRA-NR (EN) DC, where the master node uses E-UTRA and the secondary node uses NR. In other embodiments, the wireless device 18 operates with NR-E-UTRA (NE) DC, where the master node uses NR and the secondary node uses E-UTRA. In still other embodiments, the wireless device 18 operates with NR-DC, where both the master node and secondary node use NR. Generally, though, the wireless device 18 in some embodiments operates with multi-radio (MR) DC, which refers to dual connectivity between E-UTRA and NR nodes, or between two NR nodes. MR-DC therefore may be seen as a generalization of Intra-U-UTRA DC, where a multiple receiver/transmitter capable device is configured to utilize resources provided by two different nodes connected via a non-ideal backhaul, one providing NR access and the other providing either E-UTRA or NR access. Regardless, in MR-DC, the wireless device 18 may have a single RRC state, based on the master node RRC and a single control plane connection towards the core network. RRC protocol data units (PDUs) generated by the secondary node can be transmitted via the master node to the wireless device 18.

In this context, FIG. 1 shows that radio network node 12A acts as the (source) master node for multi-connectivity operation. Radio network node 12B may for instance act as a (target) secondary node for multi-connectivity operation. The radio network node 12A acting as master node transmits to the wireless device 18 a configuration message 20. The configuration message 20 includes one or more conditional PSCell configurations 22, e.g., one or more conditional PSCell change (CPC) configurations or one or more conditional PSCell addition configurations. Each conditional PSCell configuration 22 comprises a PSCell configuration, e.g., in the form of a Radio Resource Control, RRC, configuration, that the wireless device is to apply, i.e., execute, when a condition is fulfilled. Such a condition may also be referred to as a triggering condition. In any event, each PSCell configuration is a configuration of a PSCell associated with a secondary node for multi-connectivity operation.

In some sense, when the wireless device 18 applies the PSCell configuration of a certain conditional PSCell configuration upon fulfillment of the associated condition, the wireless device 18 may be said to apply that certain conditional PSCell configuration. As used at times herein, then, application of a certain conditional PSCell configuration refers to application of the PSCell configuration of that certain conditional PSCell configuration.

When the condition for applying the PSCell configuration of at least one of the one or more conditional PSCell configurations 22 is fulfilled, the wireless device 18 transmits, to the master node 12A, an applied indication 24. The applied indication 24 indicates application by the wireless device 18 of at least one of the one or more conditional PSCell configurations 22; that is, application by the wireless device 18 of the PSCell configuration of at least one of the one or more conditional PSCell configurations 22.

In some embodiments, responsive to the configuration message 20, the wireless device 18 transmits the applied indication 24 in a first message 26, e.g., a first RRC Reconfiguration Complete message or a first RRC Connection Reconfiguration Complete message. If, for example, the configuration message 20 includes a master configuration 28 that is associated with the master node 12A and that the wireless device 18 is to apply, the wireless device 18 may transmit the first message 26, e.g., at Time T1, upon receipt of the configuration message 20. And the wireless device 18 may generate this first message to include an acknowledgement indication (not shown) that indicates acknowledgement of the receipt, applying of, and/or understanding of the master configuration 28. In this case, if the condition for at least one of the one or more conditional PSCell configurations 22 is fulfilled already when the wireless device 18 received the configuration message 20 and/or is to transmit the first message 26, then the wireless device 18 may already include the applied indication 24 in the first message 26.

In other embodiments, though, the wireless device 18 transmits the applied indication 24 in a second message 30, e.g., that is different than the first message 26 and/or does not include any such acknowledgement indication. The second message may for instance be a second RRC Reconfiguration Complete message or a second RRC Connection Reconfiguration Complete message. The wireless device 18 may do so as part of deferring transmitting the applied indication 24 until fulfillment of the condition for at least one of the one or more conditional PSCell configurations 22. That is, in some embodiments, responsive to receiving the configuration message 20, the wireless device 18 evaluates whether the condition for at least one of the one or more conditional PSCell configurations 22 is fulfilled. The wireless device 18 may perform this evaluation when the configuration message 20 is received and/or monitor for fulfillment of such a condition. When the condition for at least one of the one or more conditional PSCell configurations 22 is fulfilled, it is at that point (but not sooner) that the wireless device 18 transmits the applied indication 24. This may mean that the wireless device 18 transmits the applied indication 24 in a second message 30, e.g., with some delay since having received the configuration message 20 and/or only after having already transmitted the first message 26 with the acknowledgement indication.

Note, though, that the wireless device 18 under some circumstances may refrain from transmitting the first message 26 at all, and may instead only transmit the second message 30 if and when the condition for at least one of the one or more conditional PSCell configurations 22 is fulfilled. For example, in some embodiments, if the configuration message 20 does not include a master configuration 28, then the wireless device 18 may refrain from transmitting the first message 26 since no acknowledgment indication needs to be sent. Instead, the wireless device 18 may just transmit the applied indication 24 in the second message 30 once the condition for at least one of the one or more conditional PSCell configurations 22 is fulfilled.

Note that the terms first message and second message are not intended to limit embodiments herein in terms of their timing or ordering. In some embodiments, the first message 26 includes both the applied indication 24 and the acknowledgment indication, in which case the second message 30 may not be transmitted at all. In other embodiments, the first message 26 includes the acknowledgment indication whereas the second message 30 includes the applied indication 24.

In still other embodiments, the first message 26 is not transmitted (no acknowledgment indication) but the second message 30 includes the applied indication 24. In this case, then, the second message 30 may be transmitted at any time after receipt of the configuration message 20 and when the condition for at least one of the one or more conditional PSCell configurations 22 is fulfilled. In one particular case, therefore, if the condition for at least one of the one or more conditional PSCell configurations 22 is fulfilled already upon receipt of the configuration message 20, the second message 30 may be transmitted with the applied indication 24 immediately in response to the configuration message 20.

Generally, then, the wireless device 18 according to some embodiments herein defers transmission of the applied indication 24, if needed, until the condition for at least one of the one or more conditional PSCell configurations 22 is fulfilled. Such deferral enables the wireless device 18 to promptly acknowledge receipt, application, and/or understanding of any master node configuration included in the configuration message 20, yet still proves timely in equipping the network 10 with knowledge about when the wireless device 18 has applied at least one of the conditional PSCell configuration(s) 22. Equipped with this knowledge in a timely fashion, the network 10 may exploit that knowledge for any number of purposes.

In some embodiments in this regard, the applied indication 24 indicates application by the wireless device of the PSCell configuration of at least one of the one or more conditional PSCell configurations 22, without necessarily indicating which PSCell configuration was applied. In these and other embodiments, then, the master node 12A may take an action that does not necessarily depend on which PSCell configuration was applied e.g. the master node, MN, may perform a reconfiguration of the master cell group, MCG, or any other master node, MN, related parameter that is common regardless of the PSCell configuration applied.

In other embodiments, the applied indication 24 indicates which of the one or more conditional PSCell configurations 22 the wireless device 18 has applied; that is, which PSCell configuration the wireless device 18 has applied. The master node 12A may thereby determine from the applied indication 24 which other conditional PSCell configuration(s) have not been applied. The master node 12A accordingly may take an action that depends on which PSCell configuration was applied and/or that depends on which PSCell configuration(s) were not applied. For example, the master node 12 may cancel any of the conditional PSCell configuration(s) 22 whose PSCell configuration(s) were not applied.

Consider an example where the configuration message 20 includes two conditional PSCell configurations, a first conditional PSCell configuration and a second conditional PSCell configuration. The applied indication 24 in this case may indicate that the wireless device 18 has applied the PSCell configuration of the first conditional PSCell configuration. The master node 12A in response to the applied indication 24 may therefore cancel the second conditional PSCell configuration.

Some embodiments therefore advantageously enable the master node 12A to transmit a message to a secondary node associated with a different one of the one or more conditional PSCell configurations 22 whose PSCell configuration the wireless device 18 has not applied. The message may for instance cancel the different one of the one or more conditional PSCell configurations 22 whose PSCell configuration the wireless device 18 has not applied.

Figure 2A:
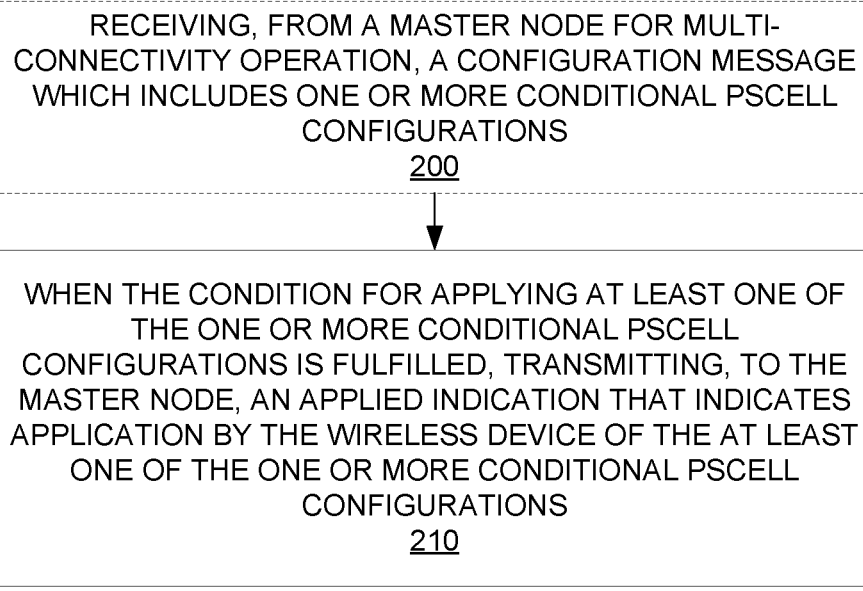
FIG. 2A is a logic flow diagram of a method performed by a wireless device according to some embodiments.

In view of the modifications and variations herein, FIG. 2A depicts a method performed by a wireless device 18 for multi-connectivity operation in accordance with particular embodiments. The method may include receiving, from a master node 12A for multi-connectivity operation, a configuration message 20 which includes one or more conditional PSCell configurations 22 (Block 200). In some embodiments, each conditional PSCell configuration 22 comprises a PSCell configuration that the wireless device 18 is to apply when a condition is fulfilled. In some embodiments, each PSCell configuration is a configuration of a primary cell of a secondary cell group (PSCell) associated with a secondary node (e.g., node 12B) for multi-connectivity operation. Regardless, the method includes, when the condition for applying at least one of the one or more conditional PSCell configurations 22 is fulfilled, transmitting, to the master node 12A, an applied indication 24 that indicates application by the wireless device 18 of the at least one of the one or more conditional PSCell configurations 22 (Block 210).

In some embodiments, the applied indication indicates which of the one or more conditional PSCell configurations the wireless devices has applied.

In some embodiments, the configuration message also includes a master configuration that is associated with the master node and that the wireless device is to apply, and wherein the method further comprises transmitting, to the master node, an acknowledgement indication that indicates acknowledgement of the receipt, applying of, and/or understanding of the master configuration.

In some embodiments, the method further comprises deferring transmitting the applied indication until fulfillment of the condition for at least one of the one or more conditional PSCell configurations.

In some embodiments, the method further comprises responsive to receiving the configuration message, evaluating whether the condition for at least one of the one or more conditional PSCell configurations is fulfilled, and determining, based on said evaluating, whether to transmit a first message in response to the configuration message and/or whether the first message is to include the applied indication. In one or more of these embodiments, the method further comprises identifying whether the configuration message also includes a master configuration that is associated with the master node and that the wireless device is to apply, and wherein said determining is also based on said identifying. In one or more of these embodiments, the method further comprises either: (i) based on identifying that the configuration message also includes the master configuration and based on evaluating that the condition for at least one of the one or more conditional PSCell configurations is fulfilled, generating the first message to include the applied indication and to include an acknowledgement indication that indicates acknowledgement of the receipt, applying of, and/or understanding of the master configuration, and transmitting the first message; (ii) based on identifying that the configuration message also includes the master configuration and based on evaluating that the condition has not been fulfilled for any of the one or more conditional PSCell configurations, generating the first message to include an acknowledgement indication that indicates acknowledgement of the receipt, applying of, and/or understanding of the master configuration, transmitting the first message, and transmitting the applied indication in a second message transmitted after the first message; or (iii) based on identifying that the configuration message does not include the master configuration and based on evaluating that the condition has not been fulfilled for any of the one or more conditional PSCell configurations, refraining from transmitting the first message and transmitting the applied indication in a second message.

In some embodiments, the method further comprises identifying whether the configuration message also includes a master configuration that is associated with the master node and that the wireless device is to apply, and transmitting or not transmitting, in response to the configuration message, a first message that includes an acknowledgement indication that indicates acknowledgement of the receipt, applying of, and/or understanding of the master configuration, depending respectively on whether or not the configuration message also includes the master configuration.

In some embodiments, the configuration message also includes a master configuration that is associated with the master node and that the wireless device is to apply. In this case, transmitting the applied indication comprises transmitting a first message in response to the configuration message, the first message includes the applied indication as well as an acknowledgement indication, and the acknowledgement indication indicates acknowledgement of the receipt, applying of, and/or understanding of the master configuration.

In some embodiments, the configuration message also includes a master configuration that is associated with the master node and that the wireless device is to apply. In this case, the method further comprises transmitting a first message in response to the configuration message, the first message includes an acknowledgement indication that indicates acknowledgement of the receipt, applying of, and/or understanding of the master configuration, and transmitting the applied indication comprises transmitting the applied indication in a second message transmitted after the first message.

In some embodiments, the first message lacks lower layer (e.g., Layer 2) acknowledgement of the configuration message.

In some embodiments, the first message is a first Radio Resource Control, RRC, Reconfiguration Complete message or a first RRC Connection Reconfiguration Complete message.

In some embodiments, the second message is a second Radio Resource Control, RRC, Reconfiguration Complete message or a second RRC Connection Reconfiguration Complete message.

Figure 2B:
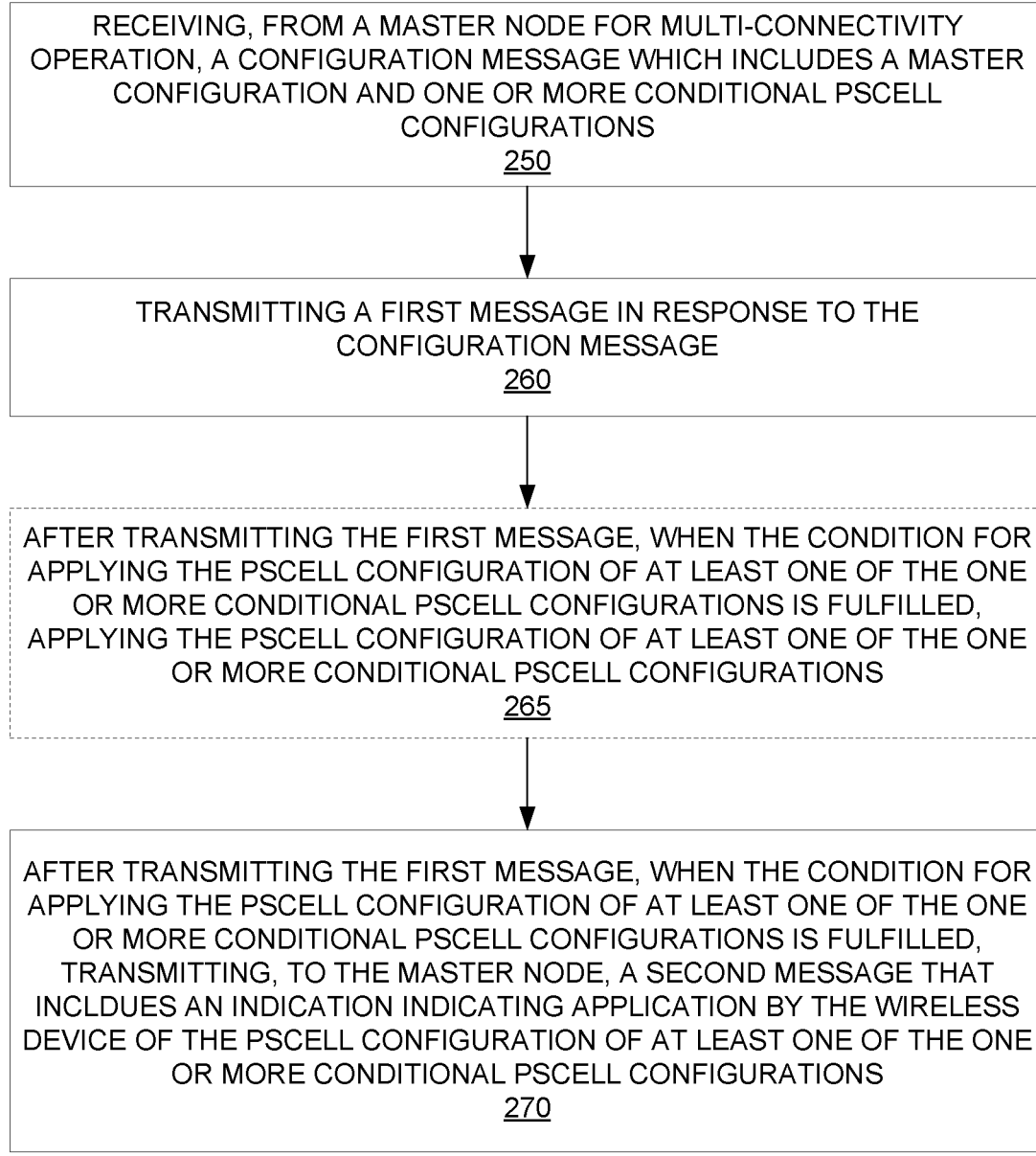
FIG. 2B is a logic flow diagram of a method performed by a wireless device according to other embodiments.

More particularly with respect to embodiments that employ a first message 26 and a second message 30, FIG. 2B depicts a method performed by a wireless device 18 for multi-connectivity operation in accordance with these particular embodiments. The method may include receiving, from a master node 12A for multi-connectivity operation, a configuration message 20 which includes a master configuration 28 and one or more conditional PSCell configurations 22 (Block 250). The configuration message 20 may, for example, include a master configuration 28 and a conditional reconfiguration (e.g., RRCReconfiguration) that includes the one or more conditional PSCell configurations 22. Regardless, in some embodiments, each conditional PSCell configuration 22 comprises a PSCell configuration that the wireless device 18 is to apply when an associated condition is fulfilled. In some embodiments, each PSCell configuration is a configuration of a primary cell of a secondary cell group (PSCell) associated with a secondary node (e.g., node 12B) for multi-connectivity operation.

Regardless, the method as shown further comprises transmitting a first message 26 in response to the configuration message 20 (Block 260). The first message 26 in some embodiments indicates (e.g., via an acknowledgement indication) acknowledgement of receipt, applying of, and/or understanding of the master configuration 28.

FIG. 2B further shows the method comprises, after transmitting the first message 26, when the condition for applying the PSCell configuration of at least one of the one or more conditional PSCell configurations 22 is fulfilled, transmitting, to the master node 12A, a second message 30 that includes an indication 24 indicating application by the wireless device 18 of the PSCell configuration of at least one of the one or more conditional PSCell configurations 22 (Block 270).

In some embodiments, the method also comprises, after transmitting the first message 26, when the condition for applying the PSCell configuration of at least one of the one or more conditional PSCell configurations 22 is fulfilled, applying the PSCell configuration of at least one of the one or more conditional PSCell configurations 22 (Block 265). In this case, then, the indication 24 included in the second message 30 may indicate that the wireless device 18 has applied the PSCell configuration of at least one of the one or more conditional PSCell configurations 22.

In some embodiments, the method also comprises, responsive to receiving the configuration message, evaluating whether the condition for at least one of the one or more conditional PSCell configurations is fulfilled. The method also comprises identifying whether the configuration message includes the master configuration and determining, based on evaluating and identifying, whether to transmit the first message in response to the configuration message. In this case, according to determining whether to transmit the first message, the first message is transmitted based on identifying that the configuration message includes the master configuration and based on evaluating that the condition has not been fulfilled for any of the one or more conditional PSCell configurations.

In some embodiments, the first message lacks Layer 2 acknowledgement of the configuration message.

In some embodiments, the first message is a first Radio Resource Control, RRC, Reconfiguration Complete message or a first RRC Connection Reconfiguration Complete message.

In some embodiments, the second message is a second Radio Resource Control, RRC, Reconfiguration Complete message or a second RRC Connection Reconfiguration Complete message.

In some embodiments, the applied indication indicates which of the one or more conditional PSCell configurations the wireless devices has applied.

In some embodiments, each conditional PSCell configuration comprises either a conditional PSCell change configuration or a conditional PSCell addition configuration.

Figure 3A:
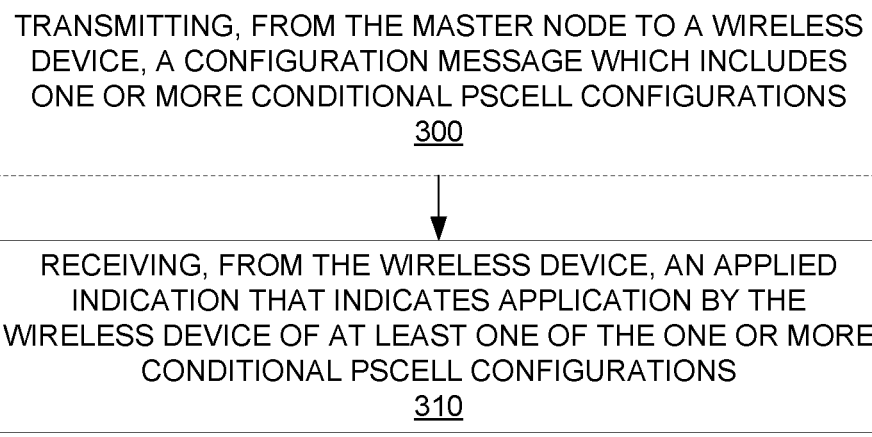
FIG. 3A is a logic flow diagram of a method performed by a radio network node according to some embodiments.

FIG. 3A depicts a method performed by a radio network node 12A acting as a master node for multi-connectivity operation in accordance with other particular embodiments. The method may include transmitting, from the master node 12A to a wireless device 18, a configuration message 20 which includes one or more conditional PSCell configurations 22 (Block 300). In some embodiments, each conditional PSCell configuration 22 comprises a PSCell configuration that the wireless device 18 is to apply when a condition is fulfilled. In some embodiments, each PSCell configuration is a configuration of a primary cell of a secondary cell group (PSCell) associated with a secondary node (e.g., node 12B) for multi-connectivity operation. Regardless, the method includes receiving, from the wireless device 18, an applied indication 24 that indicates application by the wireless device 18 of at least one of the one or more conditional PSCell configurations 22 (Block 310).

In some embodiments, the applied indication is not received until fulfillment of the condition for at least one of the one or more conditional PSCell configurations.

In some embodiments, the configuration message also includes a master configuration that is associated with the master node and that the wireless device is to apply. In this case, said receiving comprises receiving a first message in response to the configuration message, and the first message includes the applied indication as well as an acknowledgement indication that indicates acknowledgement of the receipt, applying of, and/or understanding of the master configuration.

In some embodiments, the configuration message also includes a master configuration that is associated with the master node and that the wireless device is to apply. In this case, the method further comprises receiving a first message in response to the configuration message, the first message includes an acknowledgement indication that indicates acknowledgement of the receipt, applying of, and/or understanding of the master configuration, and receiving the applied indication comprises receiving a second message after receiving the first message, wherein the second message includes the applied indication. In one or more of these embodiments, the first message lacks lower layer (e.g., Layer 2) acknowledgement of the configuration message. In one or more of these embodiments, the first message is a first Radio Resource Control, RRC, Reconfiguration Complete message or a first RRC Connection Reconfiguration Complete message. In one or more of these embodiments, the second message is a second Radio Resource Control, RRC, Reconfiguration Complete message or a second RRC Connection Reconfiguration Complete message.

In some embodiments, the applied indication indicates which of the one or more conditional PSCell configurations the wireless devices has applied.

In some embodiments, the method further comprises, responsive to receiving the applied indication indicating application by the wireless device of at least one of the one or more conditional PSCell configurations, transmitting a message to a secondary node associated with a different one of the one or more conditional PSCell configurations that the wireless device has not applied. In one or more of these embodiments, the message indicates that the wireless device has not applied the different one of the one or more conditional PSCell configurations. In one or more of these embodiments, the message cancels the different one of the one or more conditional PSCell configurations.

Figure 3B:
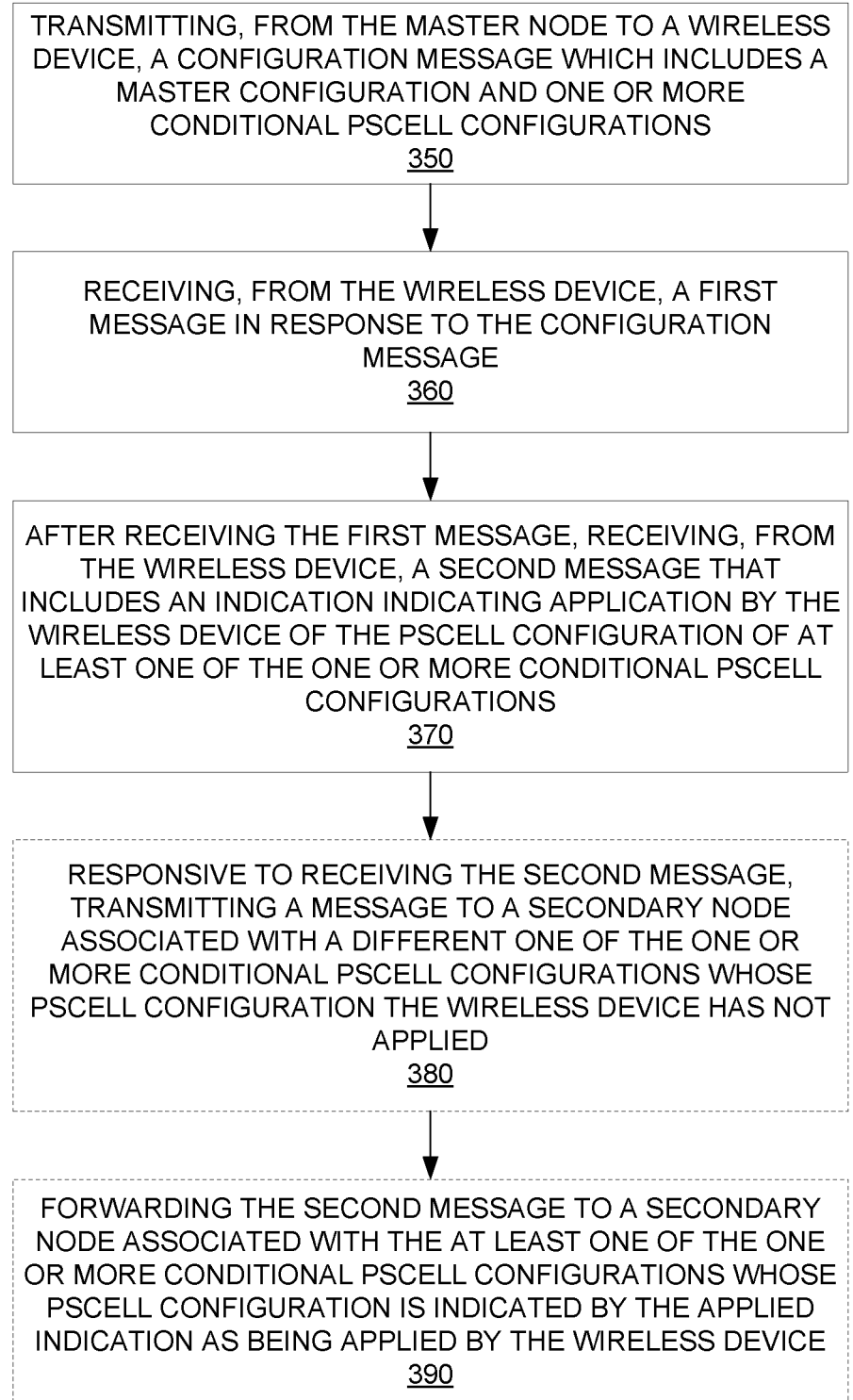
FIG. 3B is a logic flow diagram of a method performed by a radio network node according to other embodiments.

More particularly with respect to embodiments that employ a first message 26 and a second message 30, FIG. 3B depicts a method performed by a radio network node 12A acting as a master node for multi-connectivity operation in accordance with other particular embodiments. The method may include transmitting, from the master node 12A to a wireless device 18, a configuration message 20 which includes a master configuration 28 and one or more conditional PSCell configurations 22 (Block 350). The configuration message 20 may, for example, include a master configuration 28 and a conditional reconfiguration (e.g., RRCReconfiguration) that includes the one or more conditional PSCell configurations 22. Regardless, in some embodiments, each conditional PSCell configuration 22 comprises a PSCell configuration that the wireless device 18 is to apply when a condition is fulfilled. In some embodiments, each PSCell configuration is a configuration of a primary cell of a secondary cell group (PSCell) associated with a secondary node (e.g., node 12B) for multi-connectivity operation.

Regardless, the method as shown further comprises receiving, from the wireless device 18, a first message 26 in response to the configuration message (Block 360). The first message 26 indicates (e.g., via an acknowledgement indication acknowledgement of the receipt, applying of, and/or understanding of the master configuration 28.

The method as shown also comprises, after receiving the first message 26, receiving, from the wireless device 18, a second message 30 that includes an indication 24 indicating application by the wireless device 18 of the PSCell configuration of at least one of the one or more conditional PSCell configurations 22 (Block 370).

In some embodiments, the method further comprises, responsive to receiving the second message 30 including the indication 24 indicating application by the wireless device 18 of the PSCell configuration of at least one of the one or more conditional PSCell configurations, transmitting a message to a secondary node associated with a different one of the one or more conditional PSCell configurations whose PSCell configuration the wireless device 18 has not applied (Block 380). In some embodiments, this message indicates that the wireless device 18 has not applied the PSCell configuration of the different one of the one or more conditional PSCell configurations and/or cancels the different one of the one or more conditional PSCell configurations.

Alternatively or additionally, the method may further comprise forwarding the second message 30 to a secondary node associated with the at least one of the one or more conditional PSCell configurations whose PSCell configuration is indicated by the indication 24 as being applied by the wireless device 18 (Block 390).

In some embodiments, the applied indication is not received until fulfillment of the condition for at least one of the one or more conditional PSCell configurations.

In some embodiments, the first message lacks Layer 2 acknowledgement of the configuration message.

In some embodiments, the first message is a first Radio Resource Control, RRC, Reconfiguration Complete message or a first RRC Connection Reconfiguration Complete message.

In some embodiments, the second message is a second Radio Resource Control, RRC, Reconfiguration Complete message or a second RRC Connection Reconfiguration Complete message.

In some embodiments, the applied indication indicates which PSCell configuration the wireless devices has applied.

In some embodiments, each conditional PSCell configuration comprises either a conditional PSCell change configuration or a conditional PSCell addition configuration.

Embodiments herein also include corresponding apparatuses. Embodiments herein for instance include a wireless device 18 configured to perform any of the steps of any of the embodiments described above for the wireless device 18.

Embodiments also include a wireless device 18 comprising processing circuitry and power supply circuitry. The processing circuitry is configured to perform any of the steps of any of the embodiments described above for the wireless device 18. The power supply circuitry is configured to supply power to the wireless device 18.

Embodiments further include a wireless device 18 comprising processing circuitry. The processing circuitry is configured to perform any of the steps of any of the embodiments described above for the wireless device 18. In some embodiments, the wireless device 18 further comprises communication circuitry.

Embodiments further include a wireless device 18 comprising processing circuitry and memory. The memory contains instructions executable by the processing circuitry whereby the wireless device 18 is configured to perform any of the steps of any of the embodiments described above for the wireless device 18.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 18. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 12A configured to perform any of the steps of any of the embodiments described above for the radio network node 12A.

Embodiments also include a radio network node 12A comprising processing circuitry and power supply circuitry. The processing circuitry is configured to perform any of the steps of any of the embodiments described above for the radio network node 12A. The power supply circuitry is configured to supply power to the radio network node 12A.

Embodiments further include a radio network node 12A comprising processing circuitry. The processing circuitry is configured to perform any of the steps of any of the embodiments described above for the radio network node 12A. In some embodiments, the radio network node 12A further comprises communication circuitry.

Embodiments further include a radio network node 12A comprising processing circuitry and memory. The memory contains instructions executable by the processing circuitry whereby the radio network node 12A is configured to perform any of the steps of any of the embodiments described above for the radio network node 12A.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
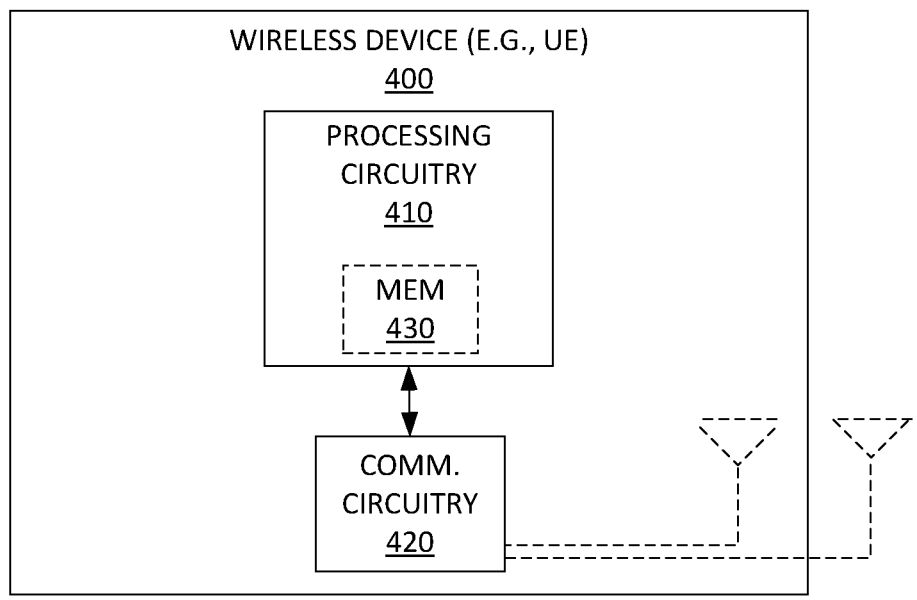
FIG. 4 is a block diagram of a wireless device according to some embodiments.

FIG. 4 for example illustrates a wireless device 400 (e.g., wireless device 18) as implemented in accordance with one or more embodiments. As shown, the wireless device 400 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the wireless device 400. The processing circuitry 410 is configured to perform processing described above, such as by executing instructions stored in memory 430. The processing circuitry 410 in this regard may implement certain functional means, units, or modules.

Figure 5:
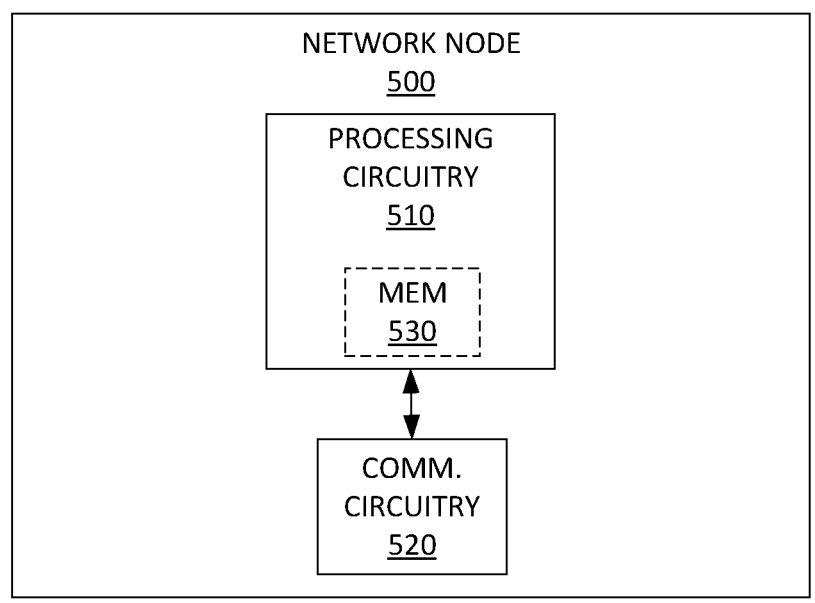
FIG. 5 is a block diagram of a radio network node according to some embodiments.

FIG. 5 illustrates a network node 500 (e.g., radio network node 12A) as implemented in accordance with one or more embodiments. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, such as by executing instructions stored in memory 530. The processing circuitry 510 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. Nonetheless, in the example context below, the master node 12A in FIG. 1 is exemplified as a master gNB or a master eNB, the secondary node 12B is exemplified as a secondary eNB or a secondary gNB, and a wireless device 18 is exemplified as a UE. In some embodiments, the configuration message 20 is exemplified as an RRCConnectionReconfiguration message and the conditional PSCell Configuration(s) 22 are exemplified as NR RRC configuration message(s) included in that message. In other embodiments for NR-DC, the configuration message 20 is exemplified as an RRCReconfiguration and the conditional PSCell configuration(s) 22 included in that message are exemplified as an RRCReconfiguration including one or more mrdc-SecondaryCellGroupConfig IEs. Alternatively or additionally, the first and/or second message in FIG. 1 are exemplified as first and/or second RRCConnectionReconfigurationComplete messages or RRCReconfiguration-Completemessage.

Figure 6A:
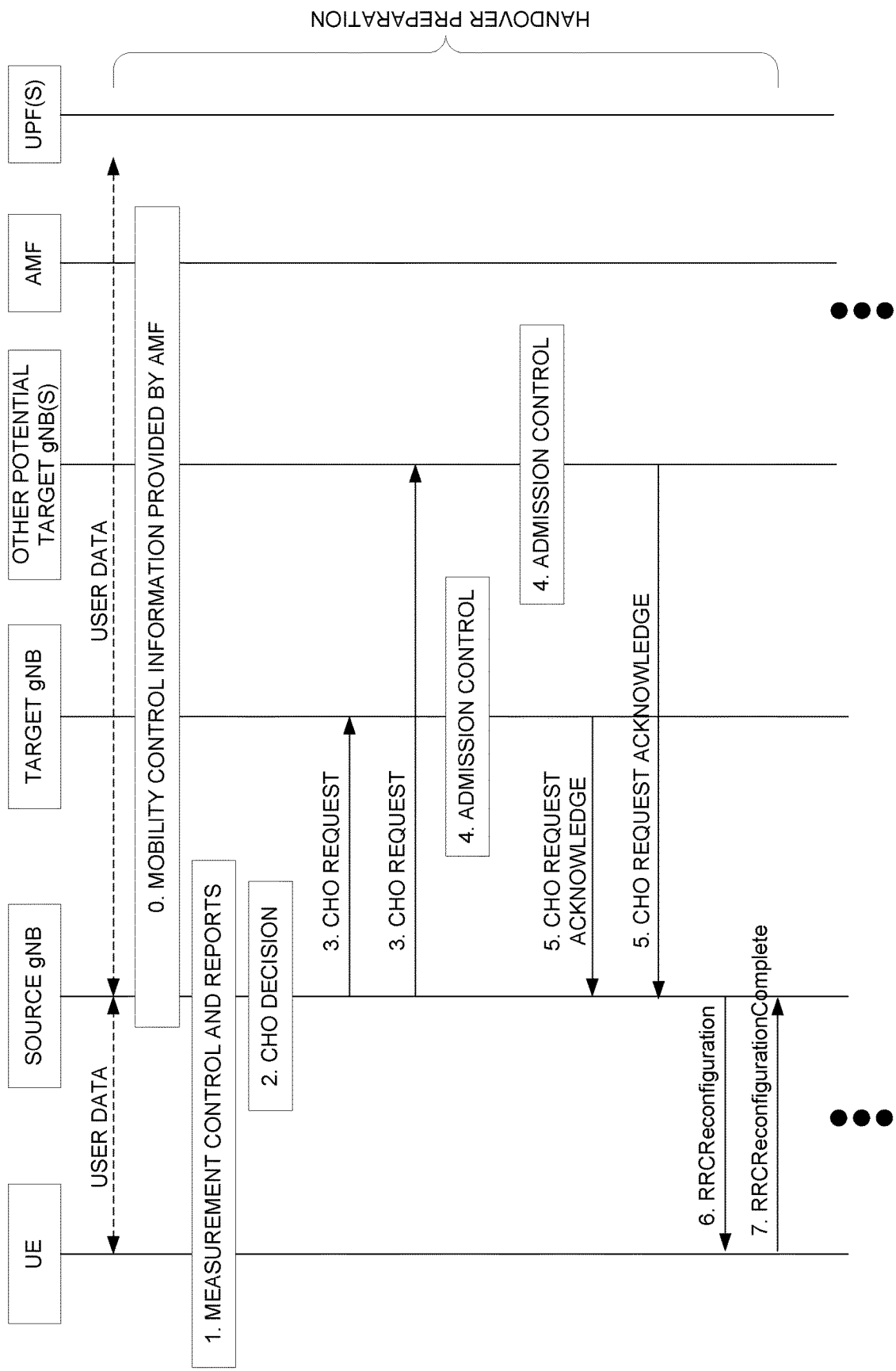
FIGS. 6A and 6B are a call flow diagram of a handover procedure according to some embodiments.
Figure 6B:
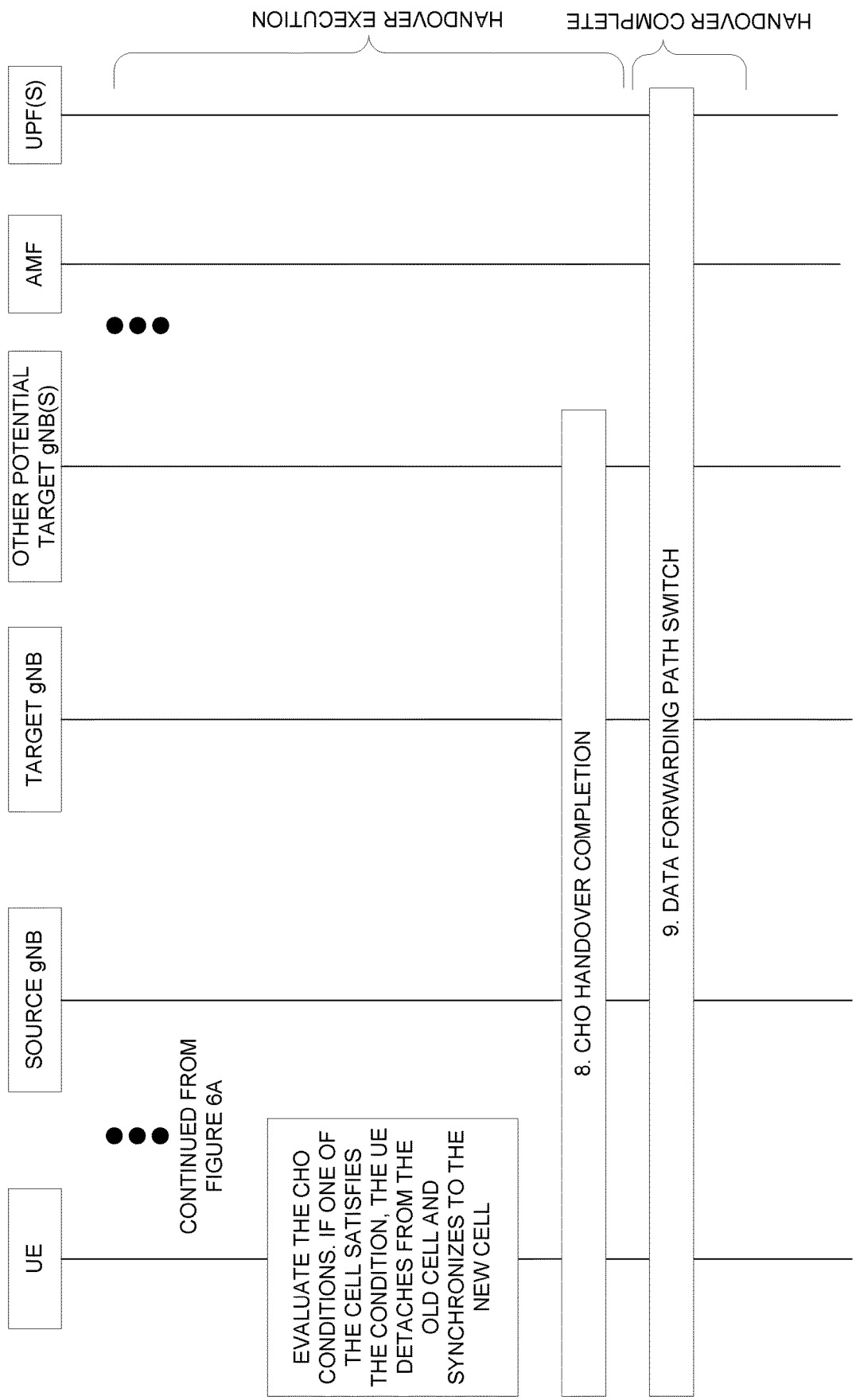

In any event, some embodiments herein are applicable to conditional handover in New Radio (NR), e.g., as specified as of Rel-16. FIGS. 6A-6B show for instance conditional handover in this context for an intra AMF/UPF conditional handover, e.g., according to 3GPP documents R2-1912781 and R2-1912636. Here, AMF is the Access and Mobility Function (AMF) and UPF is the User Plane Function (UPF) of a 5G system.

Step 6. The source gNB sends a RRCReconfiguration message to the UE, containing the configuration of CHO candidate cell(s) and CHO execution condition(s).

Step 7. UE sends an RRCReconfigurationComplete message to the source gNB.

Step 8. UE maintains the connection with source gNB after receiving CHO configuration, and starts evaluating the CHO execution conditions for the candidate cell(s). If at least one CHO candidate cell satisfies the corresponding CHO execution condition, the UE detaches from the source gNB, applies the stored corresponding configuration for that selected candidate cell and synchronises to that candidate cell and completes the RRC handover procedure by sending RRCReconfigurationComplete message to target gNB.

Step 9. Data forwarding for a PATH switch

The RRCReconfiguration message in Step 6 has heretofore been structured as follows:

| RRCReconfiguration message |
|---|
| -- ASN1START |
| -- TAG-RRCRECONFIGURATION-START |
| RRCReconfiguration ::=                SEQUENCE { |
|    rrc-TransactionIdentifier          RRC-TransactionIdentifier, |
|    criticalExtensions                 CHOICE { |
|      rrcReconfiguration              RRCReconfiguration-IEs, |
|      criticalExtensionsFuture        SEQUENCE { } |
|    } |
| } |
| <<Omitted parts>> |
| RRCReconfiguration-v1560-IEs ::=      SEQUENCE { |
|    mrdc-SecondaryCellGroupConfig      SetupRelease { |
|      MRDC-SecondaryCellGroupConfig }     OPTIONAL, -- Need M |
|    radioBearerConfig2                 OCTET STRING (CONTAINING |
|      RadioBearerConfig)                  OPTIONAL, -- Need M |
|    sk-Counter                         SK-Counter OPTIONAL, -- Need N |
|    nonCriticalExtension               RRCReconfiguration-v16-IEs |
|      OPTIONAL |
| } |
| RRCReconfiguration-v16-IEs ::=        SEQUENCE { |
|    conditionalReconfiguration         ConditionalReconfiguration |
|      OPTIONAL, -- Need M |
|    nonCriticalExtension               SEQUENCE   OPTIONAL |
| } |

Step 0. The UE context within the source gNB contains information regarding roaming and access restrictions which were provided either at connection establishment or at the last timing advance (TA) update.

Step 1. The source gNB configures the UE measurement procedures and the UE reports according to the measurement configuration.

Step 2. The source gNB decides to use CHO. The decision may be based on MeasurementReport and Radio Resource Management (RRM) information.

Step 3. The source gNB issues a CHO Request message to one or more candidate gNBs.

Step 4. Admission Control may be performed by the target gNB(s). Slice-aware admission control shall be performed if the slice information is sent to the target gNB. If the packet data unit (PDU) sessions are associated with non-supported slices the target gNB shall reject such PDU Sessions.

Step 5. The candidate gNB(s) sends a CHO response including configuration of CHO candidate cell to the source gNB.

The IE ConditionalReconfiguration is used to add, modify or release a conditional handover configuration per target candidate cell.

| ConditionalReconfiguration information element |
|---|
| -- ASN1START |
| -- TAG-CONDITIONAL-RECONFIG-START |
| ConditionalReconfiguration ::=        SEQUENCE { |
|    condReconfigurationToRemoveList |
|    CondReconfigurationToRemoveList    OPTIONAL, -- Need N |
|    condReconfigurationToAddModList |
|    CondReconfigurationToAddModList    OPTIONAL, -- Need N |
|    ... |
| } |
| CondReconfigurationToRemoveList ::=   SEQUENCE (SIZE |
|    (1..maxNrofCondReconf)) OF CondReconfigurationId |
| -- TAG-CONDITIONAL-RECONFIG-STOP |
| -- ASN1STOP |

The IE ConditionalReconfigurationId is used to identify a conditional reconfiguration i.e. linking of trigger conditions and an RRCReconfiguration to be applied upon the fulfilment of the conditions.

| ConditionalReconfigurationId information element |
|---|
| -- ASN1START<br>-- TAG-CONDRECONFIGURATIONID-START<br>CondReconfigurationId ::= INTEGER (1.. maxNrofCondReconf)<br>-- TAG-CONDRECONFIGURATIONID-STOP<br>-- ASN1STOP |

The IE CondReconfigurationToAddModList concerns a list of conditional handover configurations to add or modify, with for each entry the measId (associated to the triggering condition configuration) and the associated RRCReconfiguration.

| CondReconfigurationToAddModList information element |
|---|
| -- ASN1START<br>-- TAG-CONDRECONFIGURATIONTOADDMODLIST-START<br>CondReconfigurationToAddModList ::=          SEQUENCE (SIZE (1.. maxNrofCondReconf)) OF CondReconfigurationAddMod<br>CondReconfigurationAddMod ::=          SEQUENCE {<br>condReconfigurationId                                    CondReconfigurationId,<br>condReconfigurationPerTargetCandidate CondReconfigurationPerTargetCandidate<br>...<br>}<br>-- TAG-CONDRECONFIGURATIONTOADDMODLIST-START<br>-- ASN1STOP |

The IE CondReconfigurationPerTargetCandidate contains a conditional reconfiguration for a target candidate cell including a trigger condition configuration which is a set of UE pointers to measurement identifiers, each measId with its trigger condition, and an associated RRCReconfiguration in an OCTET STRING to be applied when all conditions associated to the measurement identifiers are fulfilled.

| CondReconfigurationPerTargetCandidate information element |
|---|
| -- ASN1START<br>-- TAG-CONDRECONFIGURATIONPERTARGETCANDIDATE-START<br>CondReconfigurationPerTargetCandidate ::=          SEQUENCE {<br>rrcReconfigurationToApply                         OCTET STRING (CONTAINING<br>                                                                              RRCReconfiguration)<br>triggerCondition                                              SEQUENCE (SIZE (1..<br>                                                                              maxNrofTriggerCond)) OF MeasId<br>...<br>}<br>-- TAG- CONDRECONFIGURATIONPERTARGETCANDIDATE-STOP<br>-- ASN1STOP |

In embodiments where the RRCReconfiguration relates to configuration of a PSCell, the RRCReconfiguration is an example of a PSCell configuration herein. In this case, then, a conditional reconfiguration that includes an RRCReconfiguration related to configuration of a PSCell is an example of a conditional PSCell configuration herein, where the RRCReconfiguration is applied upon fulfilment of the associated trigger condition.

UE Omitting Complete-Message for Conditional Handover

A UE, in a conditional handover-scenario, may optionally send an RRC reconfiguration complete-message to the source node in response to receiving the conditional handover. The legacy behaviour is that, when a UE receives an RRC reconfiguration message, the UE sends an acknowledgement to the network indicating the receipt, applying of, and/or understanding of the configuration. In a conditional handover scenario, this would correspond to that a UE responds to the network indicating that the UE has started monitoring the conditions associated with the conditional handover.

However, in a scenario where the conditions in the conditional handover command are fulfilled already at reception of the conditional handover command, it would cause unnecessary delays if the UE would be forced to acknowledge the reception of the conditional handover command to the source node. Instead, the UE can selectively transmit the acknowledgement to the source node such that the UE can omit the acknowledgement if the conditions are fulfilled already upon reception of the conditional handover command, while if the conditions are not fulfilled, the UE may send the acknowledgment. This allows the UE to directly perform the handover if the conditions are fulfilled upon reception and hence handover delays can be reduced which would improve handover robustness.

Multi-Radio Dual Connectivity (MR-DC)

As defined in 3GPP Technical Specification (TS) 37.340 v15.7.0, Multi Radio Dual Connectivity (MR-DC) is a generalization of the Intra-E-UTRA Dual Connectivity (DC) described in TS 36.300 v15.7.0, where a multiple Rx/Tx capable UE may be configured to utilise resources provided by two different nodes connected via a non-ideal backhaul, one providing NR access and the other one providing either E-UTRA or NR access. One node acts as the MN and the other as the SN. The MN and SN are connected via a network interface and at least the MN is connected to the core network.

Since Rel-15, MR-DC can be supported in different architectures:
- E-UTRAN supports MR-DC via E-UTRA-NR Dual Connectivity (EN-DC);
- NG-RAN E-UTRA-NR Dual Connectivity (NGEN-DC);
- NR-E-UTRA Dual Connectivity (NE-DC);
- NR-NR Dual Connectivity (NR-DC);

A first MR-DC procedurein is the SN addition. From the UE perspective, that occurs for example, when an SCG is being added (e.g. if an MCG split bearer is configured and/or an SN terminated bearer, either associated to an SCG or an MCG).

Figure 7:
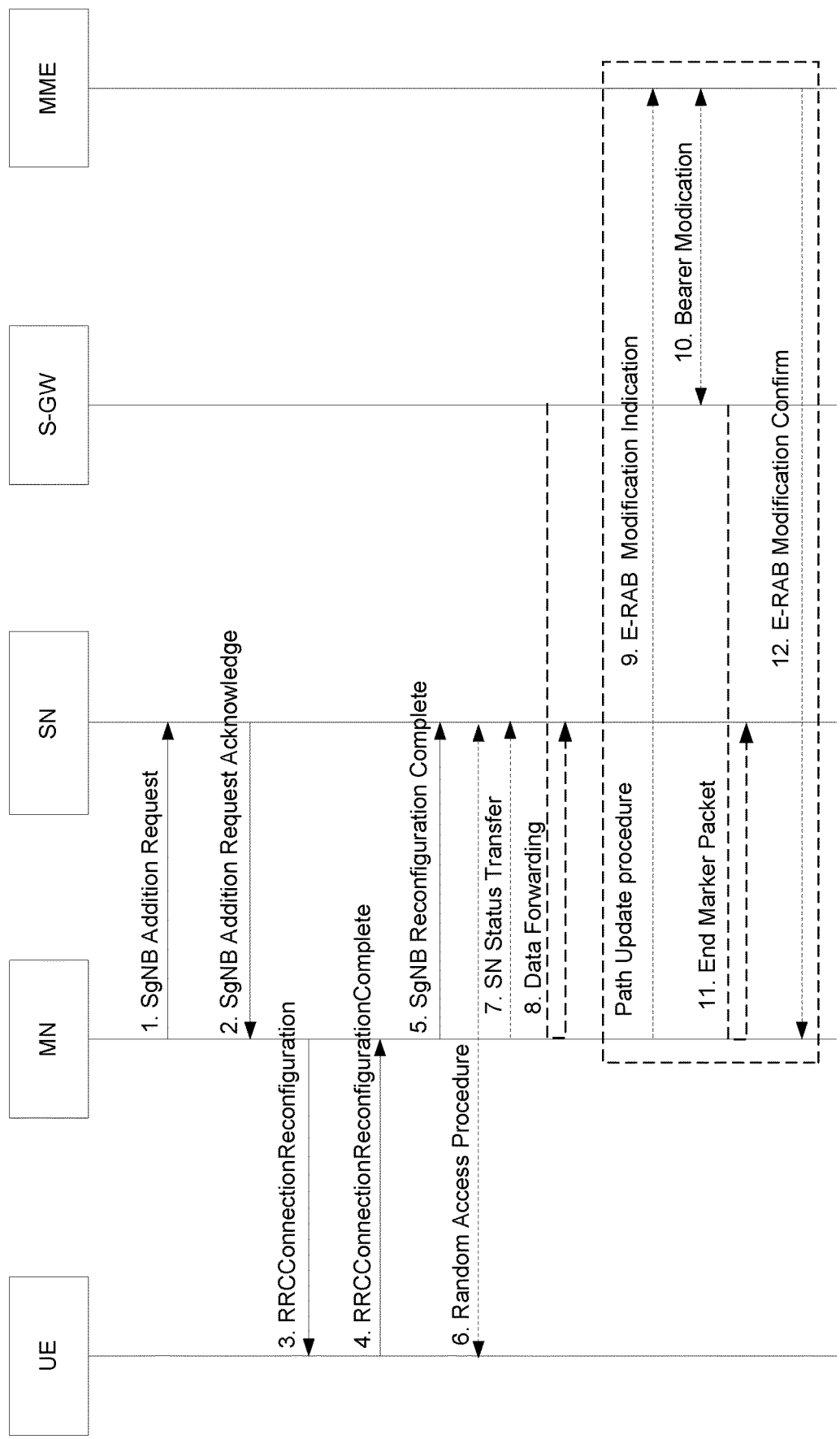
FIG. 7 is a signalling flow for the case of SN Addition for a UE to operate in EN-DC according to some embodiments.

FIG. 7 shows a signalling flow for the case of SN Addition for a UE to operate in EN-DC. Therein, the Secondary Node Addition procedure is initiated by the MN (in this case an LTE eNB) and is used to establish a UE context at the SN (in this case an NR gNB) to provide resources from the SN to the UE. For bearers requiring SCG radio resources, this procedure is used to add at least the first cell of the SCG. This procedure can also be used to configure an SN terminated MCG bearer (where no SCG configuration is needed).

The UE behaviour in the procedure of FIG. 7 is the following:

[ . . . ]

3. The MN sends to the UE the RRCConnectionReconfiguration message including the NR RRC configuration message, without modifying it.

4. The UE applies the new configuration and replies to MN with RRCConnectionReconfigurationComplete message, including a NR RRC response message, if needed. In case the UE is unable to comply with (part of) the configuration included in the RRCConnectionReconfiguration message, it performs the reconfiguration failure procedure.

[ . . . ]

Figure 8:
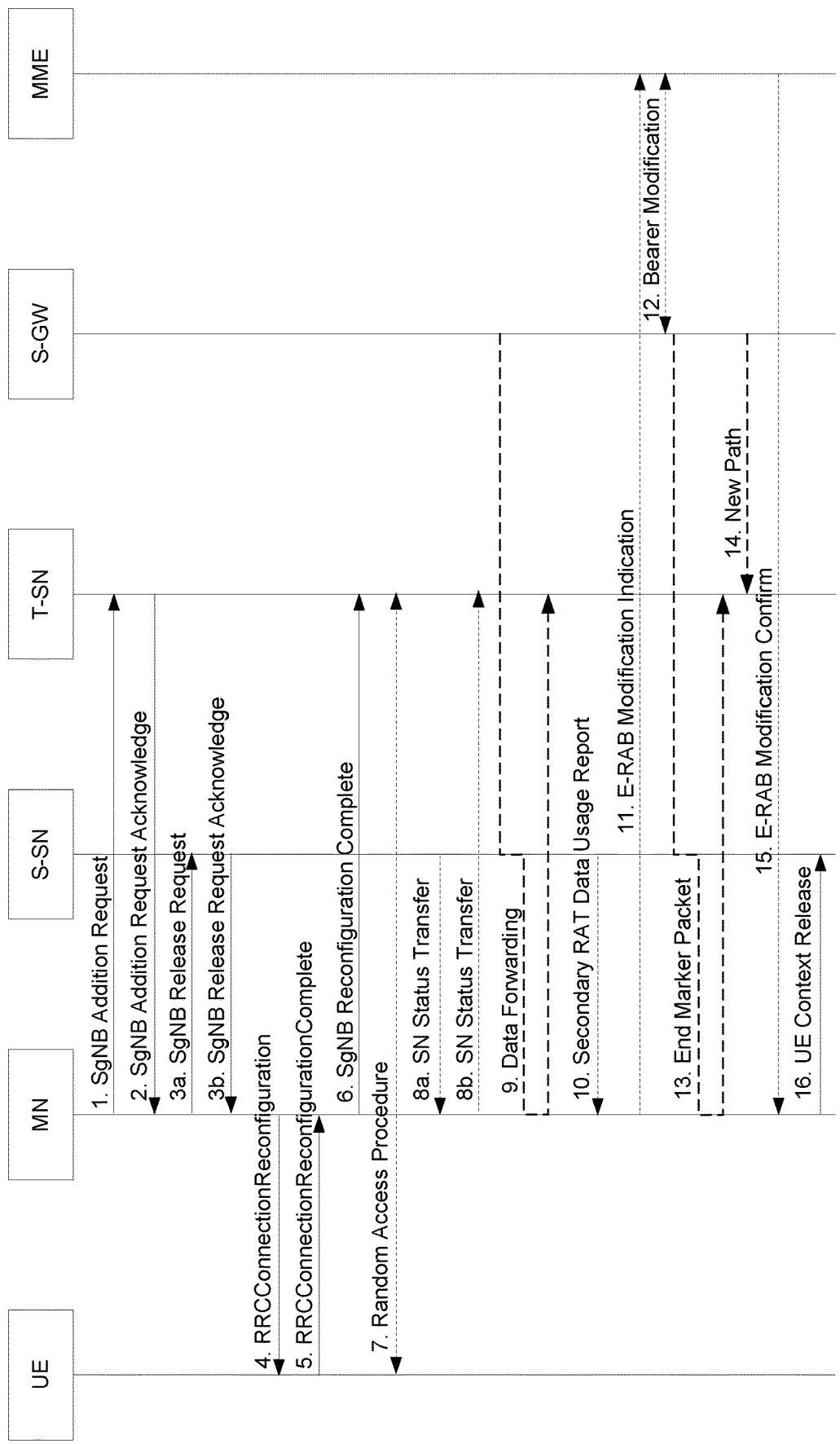
FIG. 8 is a signalling flow for the EN-DC case of SN Addition as initiated by an MN according to some embodiments.

In other words, the UE applies the RRCConnectionReconfiguration message transmitted by the MN, including the NR RRC configuration message that is encapsulated, and replies with an RRCConnectionReconfigurationComplete message to the MN, including an NR response message. This is specified in LTE RRC (TS 36.331-f70) as follows:

Reception Of An Rrcconnectionreconfiguration Not Including The Mobilitycontrolinfo By The UE If the RRCConnectionReconfiguration message does not include the mobilityControlInfo and the UE is able to comply with the configuration included in this message, the UE shall:
1> set the content of RRCConnectionReconfigurationComplete message as follows:
[ . . . ]
2> if the received RRCConnectionReconfiguration message included nr-SecondaryCellGroupConfig:
3> include scg-ConfigResponseNR in accordance with TS 38.331 [82], clause 5.3.5.3;

SN modification for a UE to operate in EN-DC may either be MN initiated or SN Initiated. For MN initiated, FIG. 8 shows the signalling flow for the EN-DC case, and the UE behaviour in the procedure is the following:

[ . . . ]

4/5. The MN triggers the UE to apply the new configuration. The MN indicates to the UE the new configuration in the RRCConnectionReconfiguration message including the NR RRC configuration message generated by the target SN. The UE applies the new configuration and sends the RRCConnectionReconfigurationComplete message, including the encoded NR RRC response message for the target SN, if needed. In case the UE is unable to comply with (part of) the configuration included in the RRCConnectionReconfiguration message, it performs the reconfiguration failure procedure.

[ . . . ]

The RRC procedure at the UE starts with a UE operating in EN-DC and receiving from the LTE MCG side an RRCConnectionReconfiguration message including NR configurations, i.e., including an nr-SecondaryCellGroupConfig (which is basically an NR RRCReconfiguration including a reconfigurationWithSync for the NR SCG, indicating to the UE that this is a PSCell change). When it comes to the handling of the complete message(s), the UE first processes the LTE message and calls the NR procedure. Then, as part of that, TS 38.331-f70 indicates that the NR complete message is to be included within the LTE complete message.

Then, as in the NR PSCell addition case, in the NR PSCell change case when the UE is operating in EN-DC, the UE receives an RRCConnectionReconfiguration message via the MN (LTE eNB), processes the NR message (including the reconfiguration with sync towards the new NR PSCell), and transmits to the MN an RRCConnectionReconfigurationComplete message including an RRCReconfigurationComplete associated to the NR SCG configuration, acknowledging a successful processing of the message and applied configurations accordingly.

Figure 9:
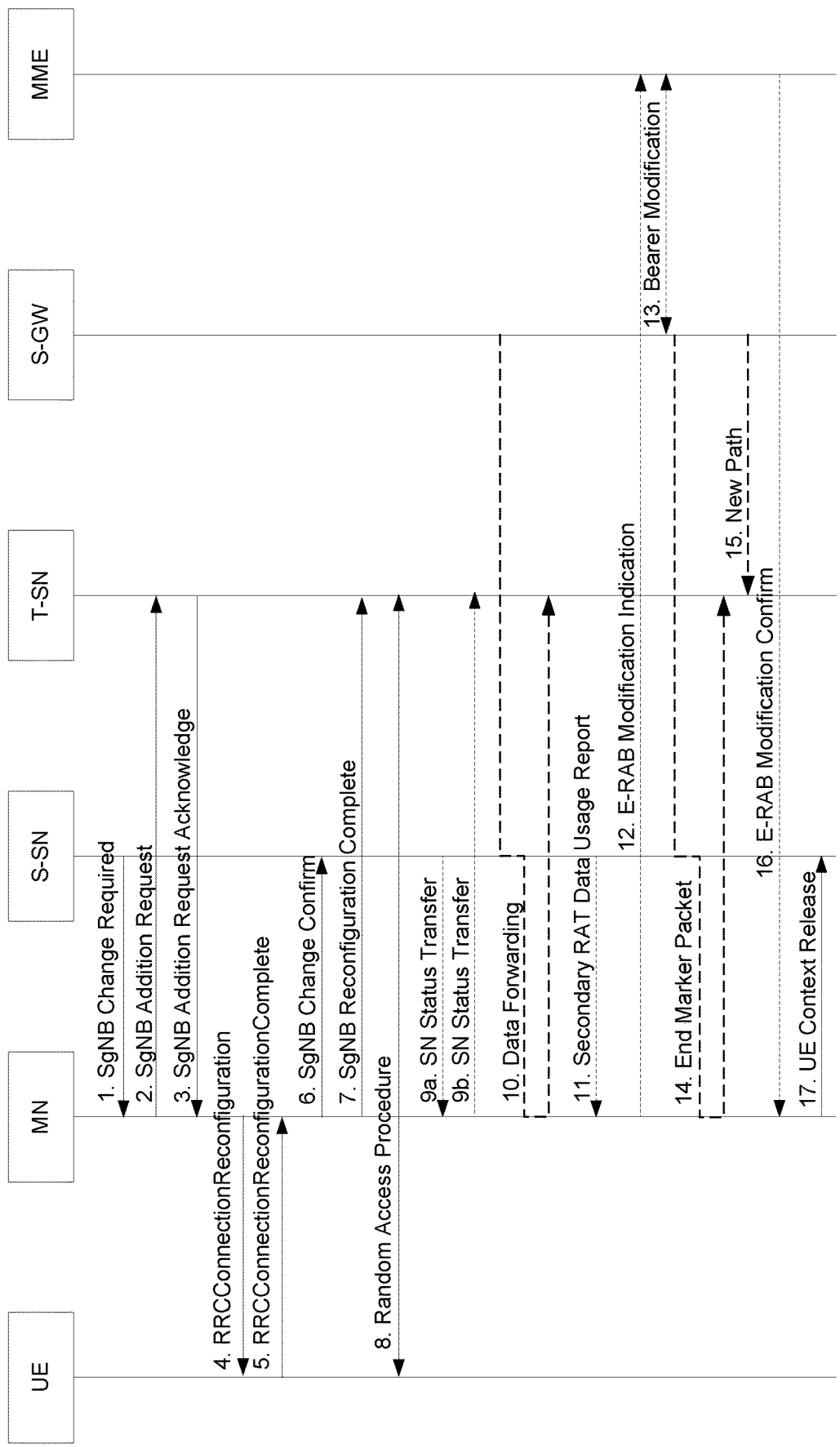
FIG. 9 is a signaling flow for SN initiated SN modification according to some embodiments.

For the SN initiated SN modification, the UE behaviour is somewhat similar as shown in FIG. 9:

[ . . . ]

4/5. The MN triggers the UE to apply the new configuration. The MN indicates the new configuration to the UE in the RRCConnectionReconfiguration message including the NR RRC configuration message generated by the target SN. The UE applies the new configuration and sends the RRCConnectionReconfigurationComplete message, including the encoded NR RRC response message for the target SN, if needed. In case the UE is unable to comply with (part of) the configuration included in the RRCConnectionReconfiguration message, it performs the reconfiguration failure procedure.

[ . . . ]

Similar signalling flows exist for the 5GC case, with no major differences in terms of UE behaviour for the sake of understanding embodiments herein.

Some embodiments are based on the following concerning conditional NR PSCell addition/change. Some embodiments maintain the Rel-15 principle that only one PScell is active at a time even with conditional PScell addition/change.

In some embodiments, for conditional PScell addition, the MN decides on the conditional PScell addition execution condition. The condition is defined by a measurement identity, given by a measurement configuration provided by the MN.

In some embodiments, for conditional PScell change, execution condition may be decided by MN (MN-initiated) or SN (SN-initiated).

In some embodiments, for conditional PScell change, A3/A5 execution condition is supported while for conditional PScell addition, A4/B1 like execution condition is supported.

In some embodiments, for conditional SN change, the source SN configuration can be used as the reference in generation of delta signalling for the candidate SNs.

Some embodiments herein address certain challenge(s) in this context. Conditional NR PSCell addition/change will be supported in EN-DC. Although not yet specified, it is assumed that the UE receives an RRCConnectionReconfiguration to configure NR PSCell addition in EN-DC, while the UE is connected to LTE. That message contains for each NR target candidate execution conditions and an RRCConnectionReconfiguration including an endc-ReleaseAndAdd set to TRUE (or equivalent configuration) to be stored and, only applied upon the fulfilment of the execution condition.

Conditional NR PSCell addition will also be supported in NR-DC. Although not yet specified, it is assumed that the UE receives an RRCReconfiguration to configure NR PSCell addition in NR-DC, while the UE is connected to NR. That message contains for each NR target candidate execution conditions and an RRCReconfiguration including an mrdc-SecondaryCellGroupConfig (or equivalent configuration) to be stored and, only applied upon the fulfilment of the execution condition.

For the NR PSCell change case, the UE is operating in EN-DC. Hence, it is assumed that the UE receives an RRCConnectionReconfiguration to configure NR PSCell change. That message contains, for each NR target candidate, execution conditions and an RRCConnectionReconfiguration including an nr-SecondaryCellGroupConfig, only applied upon the fulfilment of the execution condition.

Conditional NR PSCell change will further be supported. Although not yet specified, it is assumed that the UE receives an RRCReconfiguration to configure NR PSCell addition in NR-DC, while the UE is connected to NR. That message contains for each NR target candidate execution conditions and an RRCReconfiguration including an mrdc-SecondaryCellGroupConfig (or equivalent configuration) to be stored and, only applied upon the fulfilment of the execution condition.

For conditional handover (CHO), upon reception of CHO configuration, the UE shall send a complete message. However, a question has heretofore remained as to whether a complete message shall be sent for conditional NR PSCell addition and/or conditional NR PSCell change.

Certain aspects of the present disclosure and their embodiments may provide solutions to these or other challenges. Some embodiments comprise a method at a wireless terminal (also called a User Equipment— UE). The method comprises receiving a configuration message (e.g. RRCConnectionReconfiguration or RRCReconfiguration) including conditional NR PSCell configuration. Here, conditional NR PSCell configuration may be a conditional NR PSCell addition configuration. Or, conditional NR PSCell configuration may be a conditional NR PSCell change configuration e.g. for a UE operating in EN-DC, NR-DC or any other MR-DC configuration.

The method also comprises transmitting to the source MN (e.g. an LTE eNB or an NR gNB) a first indication (e.g. a configuration complete indication such as RRCConnectionReconfigurationComplete or RRCReconfigurationComplete) to acknowledge the receipt and/or understanding of the source's configuration in the message. That source's configuration may be the MN's configuration.

The method also comprises transmitting to the source MN (e.g. an LTE eNB or an NR gNB) a second indication (e.g. a configuration complete indication such as RRCConnectionReconfigurationComplete or RRCReconfigurationComplete) to acknowledge the execution of a conditional PSCell addition (or conditional PSCell change). The execution of a conditional PSCell addition (or conditional PSCell change) occurs upon the fulfilment of trigger/execution conditions upon which the UE applied a target candidate stored configuration e.g. an RRCReconfiguration including MR-DC configurations.

There are numerous variants concerning how the first and the second configuration complete indications are transmitted from the UE to the source MN.

In one variant (two complete messages), a first indication is transmitted in a first message (e.g. a first configuration complete indication in RRC Reconfiguration complete message such as in an RRCConnectionReconfigurationComplete or RRCReconfigurationComplete) to acknowledge the receipt, applying of, and/or understanding of the source's configuration in the message. And, a second indication is transmitted in a second message (e.g. a second RRC Reconfiguration complete message such as in an RRCConnectionReconfigurationComplete or RRCReconfigurationComplete) to acknowledge the execution of a conditional PSCell addition (or conditional PSCell change).

In another variant (single complete message), a first configuration complete to acknowledge the receipt, applying of, and/or understanding of the source's configuration in the message and a second configuration complete indication to acknowledge the execution of a conditional PSCell addition (or conditional PSCell change) are included in a single response message. In some embodiments, upon reception of the RRC Reconfiguration message, the UE determines that the execution conditions have been fulfilled and the UE omits the L2 acknowledgement of the RRC Reconfiguration message and then only sends a single complete message.

In another variant (two complete messages vs. single complete message), the usage of a single complete message depends on conditions.

For example, upon reception of the NR PSCell addition configuration, the UE determines if the execution condition for at least one cell is fulfilled. If execution conditions have been fulfilled for at least one target candidate cell, the UE includes in a single message the first and the second indications; Alternatively, the UE omits the L2 acknowledgement of the RRC Reconfiguration message and the UE includes a single message the first and the second indications. Else, the UE includes in the first message the first indication. And, the UE transmits a second complete message with the second indication upon the fulfilment of execution conditions associated.

Upon reception of the conditional NR PSCell addition configuration, the UE determines if the message includes only conditional NR PSCell addition configuration. If the message only includes conditional NR PSCell addition configuration, i.e., no MN source's configuration, the UE does not transmit a response message. And, a single message is transmitted upon the fulfilment execution conditions for PSCell addition. Else, if the message includes MN source's configuration(s), the UE transmit a response message with the first indication.

Sending of one or two complete messages depending on the exact scenario enables fast processing of the procedures.

In this regard, certain embodiments may provide one or more of the following technical advantage(s). One advantage of transmitting two complete messages is that the acknowledgement related to the source's configuration can be processed as fast as possible, which enable the source MN receiving the message to make sure that the UE has properly decoded the message and has applied the MN's configurations.

Then, the second message indicates the execution of the second condition, upon which the source MN can perform follow up procedures with the SN e.g. such as indicate to the SN associated to the target cell where the UE has executed the conditional PSCell addition and/or cancel the other non-executed SN candidates that were prepared.

For the variant where a single message is transmitted, the UE gains in terms of transmission efficiency in terms of resources, as a single message includes both indications acknowledging the proper configuration of the UE's source's configuration and the MR-DC configurations, like SCG configurations.

Handling of complete message for conditional SN addition

According to some embodiments, e.g. when applied for a UE that is EN-DC capable, the UE receives an RRCConnectionReconfiguration including conditional NR PSCell configuration (PSCell addition or PSCell change) and responds to the source (i.e. the MN, which is an LTE eNB) with an RRCConnectionReconfigurationComplete, to acknowledge the receipt and understanding of the source's configuration in the message. As the conditional NR PSCell configuration is not applied upon reception, the UE would not include an scg-ConfigResponseNR (or equivalent) in the RRCConnectionReconfigurationComplete until the fulfilment of the associated execution condition so that the stored RRCConnectionReconfiguration including conditional NR PSCell configuration is applied and, as a response to it, a new RRCConnectionReconfigurationComplete is generated to be transmitted to the MN and this time, including an scg-ConfigResponseNR. The new RRCConnectionReconfigurationComplete may indicate which NR PSCell configuration has been applied by the UE. In this case, then, the first RRCConnectionReconfigurationComplete that does not include the scg-ConfigResponseNR exemplifies the first message 26 herein. And the new RRCConnectionReconfigurationComplete exemplifies the second message 30 herein, with the included scg-ConfigResponseNR exemplifying the applied indication 24 herein.

On the network side, the MN (in EN-DC an LTE eNB) would then forward that to the SN, i.e. the MN informs the SN that the UE has fulfilled the execution condition and has completed the conditional NR PSCell addition procedure (conditional reconfiguration in more general terms, which may also be a conditional PSCell change) successfully via SgNB ReconfigurationComplete message, including the encoded NR RRC response message, if received from the UE.

Figure 10:
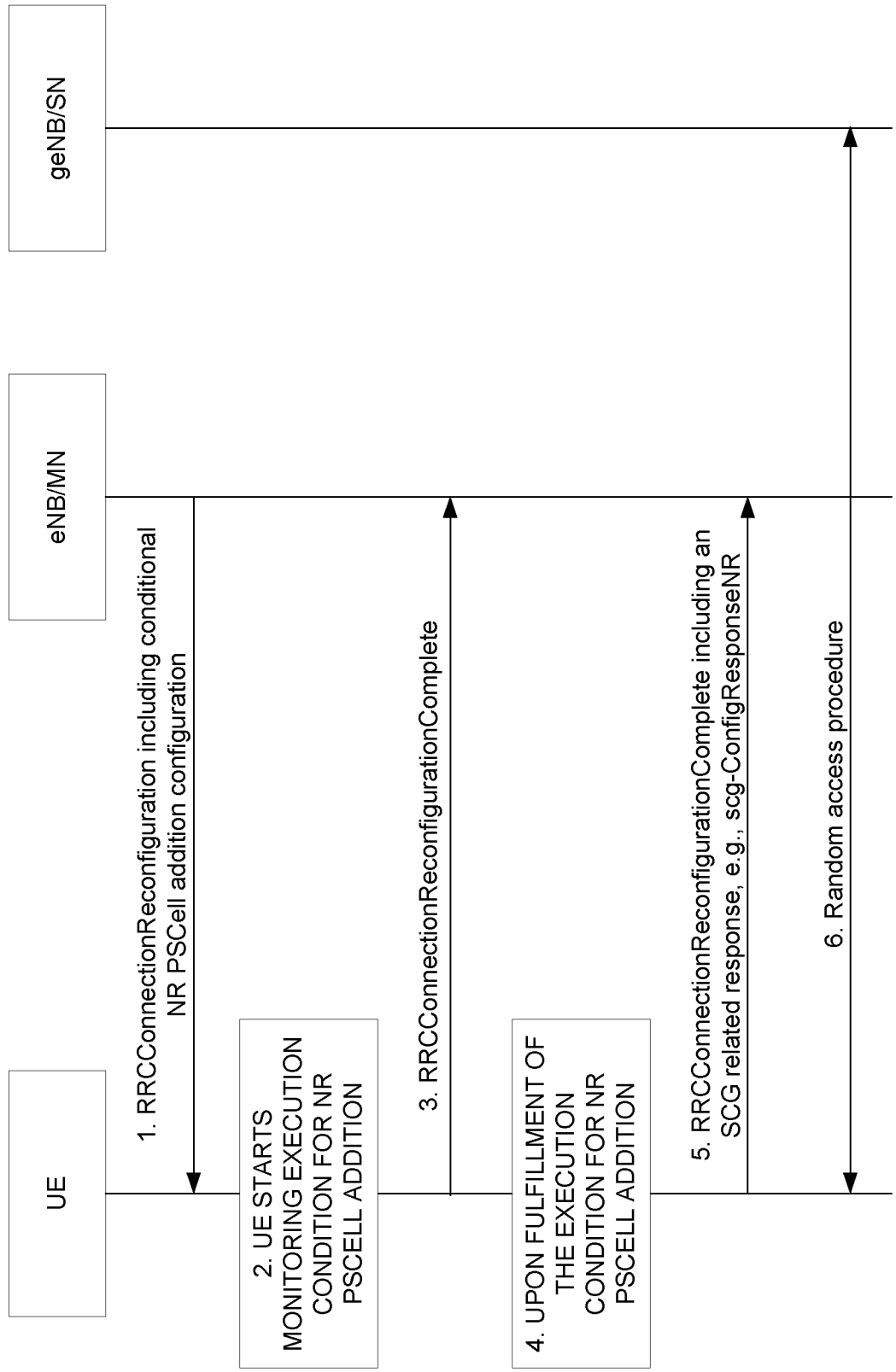
FIG. 10 is a signaling flow for conditional PSCell addition according to some embodiments.

An example focusing on UE impact is shown in FIG. 10. As shown, the UE in step 1 receives an RRCConnectionReconfiguration that includes a conditional NR PSCell addition configuration. The UE in step 2 starts monitoring the execution condition for this NR PSCell addition configuration. In Step 3, the UE sends an RRCConnectionReconfigurationComplete message even before fulfilment of the execution condition. Then, upon fulfilment of the execution condition for the NR PSCell addition configuration (step 4), the UE sends another RRCConnectionReconfigurationComplete message, including an SCG related response, e.g., scg-ConfigResponseNR (step 5). This SCG related response indicates the execution of conditional NR PSCell addition or change.

Upon receiving the second complete message from the UE (RRCConnectionReconfiguration including the NR SCG related ack) that indicates the execution of conditional NR PSCell addition or change the MN also sends an indication to the other NR PSCell target candidate(s) (i.e. those NR PSCells which were not triggered by the UE) so that they can release their resources and/or suspend any other related operation (not shown). That could be done with a Conditional NR PSCell addition or change cancelling message or equivalent indication.

After random access (step 6), the UE continues the communication with the SN as a legacy SN addition or Modification e.g. NR PSCell addition procedure, according to NR specifications.

In some embodiments, according to a first enhancement, upon reception of an RRCConnectionReconfiguration including conditional NR PSCell configuration (e.g. execution/trigger conditions equivalent to an event B1 or B2, for a measurement object associated to an SSB frequency/ARFCN X), the UE decodes the execution/trigger conditions, and performs the following actions. The UE determines that it complies with the configuration and determines if execution/trigger conditions associated to at least one NR PSCell candidate target cell for NR PSCell addition or change in the configuration have been fulfilled.

If the UE determines that the execution/trigger conditions have not been fulfilled for ANY of the NR PSCell candidate target cells for NR PSCell addition or change in the configuration, the UE sets the content of the complete message to be transmitted to the MN (e.g. RRCConnectionReconfigurationComplete) without including any MR-DC related response (e.g. an acknowledgement that the UE has been configured with SN terminated bearers and/or an SCG configuration, like not including an scg-ConfigResponseNR as defined in TS 38.331 v15.7.0, clause 5.3.5.3). The UE is not considered to be in NE-DC operation i.e. it does NOT transfer the RRCConnectionReconfigurationComplete message via SRB1 embedded in NR RRC message RRCReconfigurationComplete. Instead, it submits the RRCConnectionReconfigurationComplete message to lower layers for transmission using the new configuration, upon which the procedure ends.

Else, if the UE determines that the execution/trigger conditions associated to at least one NR PSCell candidate target cell for NR PSCell addition or change in the configuration have been fulfilled, the UE sends a single complete message including an MR-DC related indication (like the scg-ConfigResponseNR as defined in TS 38.331 v15.7.0, clause 5.3.5.3. The UE sends this single complete message instead of transmitting a first complete message to acknowledge the reception of the configuration and, upon verifying the fulfilment of the execution conditions sending a second message (this time possibly including an MR-DC related indication (like the scg-ConfigResponseNR as defined in TS 38.331 v15.7.0, clause 5.3.5.3).

Consider one embodiment equivalent to how this can be modelled in the RRC specifications (e.g. LTE TS 36.331). Upon reception of conditional NR PSCell addition (or change) configurations, and upon determining that the execution conditions have been fulfilled to at least one target candidate NR cell, the UE aborts the transmission of the first acknowledgement message (RRCConnectionReconfigurationComplete). As the conditions are fulfilled for at least one cell, the procedure will be called (but associated to another message, the one provided in a container and containing MR-DC configurations) and transmission of the complete message will be called and the content of the complete message should be set (including MR-DC related configurations, like the scg-ConfigResponseNR as defined in TS 38.331, clause 5.3.5.3) and the message transmitted.

One case could occur if the stored message containing the target's candidate configuration contains in itself conditional reconfigurations that are fulfilled upon conditional reconfiguration execution. In that case, the complete message can also be aborted until the execution of the follow up message occurs, so the complete message is finally transmitted.

Consider now a possible change to TS 36.331 for conditional EN-DC configuration according to some embodiments.

5.3.5.3 Reception Of An Rrcconnectionreconfiguration Not Including The Mobilitycontrolinfo By The UE If the RRCConnectionReconfiguration message does not include the mobilityControlInfo and the UE is able to comply with the configuration included in this message, the UE shall:
[ . . . ]
1> if the RRCConnectionReconfiguration message includes the conditionalReconfiguration:
    2> perform conditional reconfiguration as specified in 5.3.5.x;
    2> if as an outcome of 5.3.5.x execution/triggering conditions are fulfilled for at least one cell:
        3> the procedure ends;
1> set the content of RRCConnectionReconfigurationComplete message as follows:
Editor's Note: FFS Whether we need exceptions to the transmission of the RRCConnectionReconfigurationComplete message in response to a CHO configuration i.e. not transmit if only conditional reconfiguration is included and/or not transmit if upon reception CHO execution condition is fulfilled.
Editor's Note: FFS Whether we need exceptions to the transmission of the RRCConnectionReconfigurationComplete message in response to a conditional NR PSCell addition configuration i.e. not transmit if only conditional NR PSCell addition is included and/or not transmit (or only transmits a single message) if upon reception NR PSCell addition execution condition is fulfilled.
Editor's Note: FFS Whether we need exceptions to the transmission of the RRCConnectionReconfigurationComplete message in response to a conditional NR PSCell change configuration i.e. not transmit if only conditional NR PSCell change is included and/or not transmit (or only transmits a single message) if upon reception NR PSCell change execution condition is fulfilled.
    2> if the received RRCConnectionReconfiguration message included nr-SecondaryCellGroupConfig:
        3> include scg-ConfigResponseNR in accordance with TS 38.331 [82], clause 5.3.5.3;
1> if the UE is configured with NE-DC:
    2> transfer the RRCConnectionReconfigurationComplete message via SRB1 embedded in NR RRC message RRCReconfigurationComplete as specified in TS 38.331 [82];
1> else:
    2> submit the RRCConnectionReconfigurationComplete message to lower layers for transmission using the new configuration, upon which the procedure ends;

Another alternative is to model the trigger for aborting the transmission of the complete message with a UE variable, that indicates whether the complete message is to be transmitted or not according to the conditions described in the method above.

In other embodiments, according to a second enhancement, upon reception of an RRCConnectionReconfiguration including conditional NR PSCell configuration (e.g. execution/trigger conditions equivalent to an event B1 or B2, for a measurement object associated to an SSB frequency/ARFCN X), the UE decodes the execution/trigger conditions, and perform the following actions. The UE determines if the message includes or not the source's configuration e.g. at least one field related to source configuration that is not conditionalReconfiguration. If the UE determines that the message includes the source's configuration e.g. at least one field related to source configuration that is not conditionalReconfiguration, the UE transmits a complete message in response to the configuration. If the UE determines that the message does not include tge source's configuration e.g. at least one field related to source configuration (only conditional PSCell addition or change configuration), the UE does not transmit a complete message in response to the configuration.

Below is shown a possible change to TS 36.331 for conditional EN-DC configuration according to these embodiments where the second enhancement is implemented.

5.3.5.3 Reception Of An Rrcconnectionreconfiguration Not Including The Mobilitycontrolinfo By The UE If the RRCConnectionReconfiguration message does not include the mobilityControlInfo and the UE is able to comply with the configuration included in this message, the UE shall:
[ . . . ]
1> if the RRCConnectionReconfiguration message includes the conditionalReconfiguration:
    2> perform conditional reconfiguration as specified in 5.3.5.x;
    2> if the received RRCConnectionReconfiguration does not include source's configuration (i.e. only includes conditionalReconfiguration:
        3> the procedure ends;
1> set the content of RRCConnectionReconfigurationComplete message as follows:
[ . . . ]

Below is shown a possible change to TS 36.331 for conditional EN-DC configuration where both the first and the second enhancements are implemented:

5.3.5.3 Reception Of An Rrcconnectionreconfiguration Not Including The Mobilitycontrolinfo By The UE If the RRCConnectionReconfiguration message does not include the mobilityControlInfo and the UE is able to comply with the configuration included in this message, the UE shall:
[ . . . ]
1> if the RRCConnectionReconfiguration message includes the conditionalReconfiguration:
    2> perform conditional reconfiguration as specified in 5.3.5.x;
    2> if the received RRCConnectionReconfiguration does not include source's configuration (i.e. only incliudes conditionalReconfiguration; or
    2> if as an outcome of 5.3.5.x execution/triggering conditions are fulfilled for at least one cell, abort the procedure;
        3> the procedure ends;
1> set the content of RRCConnectionReconfigurationComplete message as follows:
[ . . . ]

The description above has focused on conditional NR PSCell addition or change for a UE that is able to operate in EN-DC, but similar principles are equally applicable to TS 38.331 if the UE is in NR and configured with a conditional NR PSCell addition or change. In the legacy NR PSCell addition case, for example, the UE in NR would receive an RRCReconfiguration including mrdc-SecondaryCellGroup-Config where the mrdc-SecondaryCellGroup is set to nr-SCG. According to that the UE performs the RRC reconfiguration according to 5.3.5.3 for the RRCReconfiguration message included in nr-SCG.

Then, according to some embodiments, e.g. when applied for a UE that is NR DC capable, the UE receives an RRCReconfiguration including per target candidate a conditional NR PSCell configuration (i.e. an RRCReconfiguration to be stored including an mrdc-SecondaryCellGroup-Config where the mrdc-SecondaryCellGroup is set to nr-SCG) and responds the source (i.e. the MN, which is an NR gNB) with an RRCReconfigurationComplete, to acknowledge the receipt and understanding of the source's configuration in the message.

As the conditional NR PSCell configuration is not applied upon reception, the UE would not include an nr-SCG-Response within scg-Response, i.e., the UE does not include MR-DC related response in the RRCReconfigurationComplete until the fulfilment of the associated execution condition so that the stored RRCReconfiguration including conditional NR PSCell configuration is applied and, as response to it, a new RRCReconfigurationComplete is generated to be transmitted to the MN and this time, including an nr-SCG-Response within scg-Response.

In this case, then, the first RRCReconfigurationComplete e that does not include the nr-SCG-Response exemplifies the first message 26 herein. And the new RRCReconfiguration-Complete exemplifies the second message 30 herein, with the included nr-SCG-Response exemplifying the applied indication 24 herein.

On the network side, the MN (in NR-DC an NR gNB) would then forward that to the SN, i.e. the MN informs the SN that the UE has fulfilled the execution condition and has completed the conditional NR PSCell addition or change procedure (conditional reconfiguration in more general terms) successfully via SN Reconfiguration Complete message, including the encoded NR RRC response message, if received from the UE.

Figure 11:
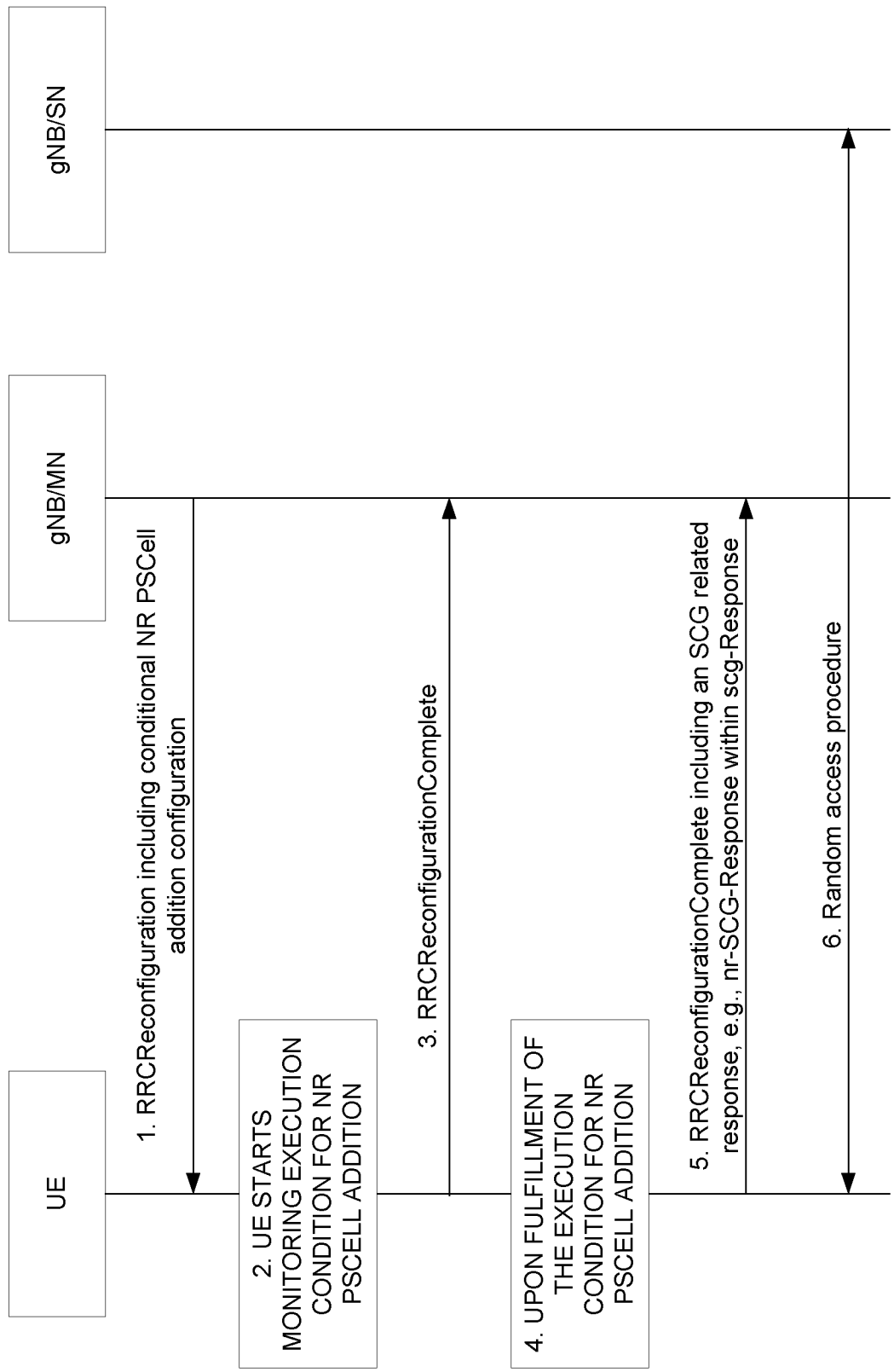
FIG. 11 is a signaling flow for conditional PSCell addition according to other embodiments.

An example focusing on UE impact is shown in FIG. 11. As shown, the UE in step 1 receives an RRCReconfiguration that includes a conditional NR PSCell addition configuration. The UE in step 2 starts monitoring the execution condition for this NR PSCell addition configuration. In Step 3, the UE sends an RRCReconfigurationComplete message even before fulfilment of the execution condition. Then, upon fulfilment of the execution condition for the NR PSCell addition configuration (step 4), the UE sends another RRCReconfigurationComplete message, including an SCG related response, e.g., nr-SCG-Response within an scg-Response (step 5). This SCG related response indicates the execution of conditional NR PSCell addition or change.

Upon receiving the second complete message from the UE (RRCReconfiguration including the NR SCG related ack) that indicates the execution of conditional NR PSCell addition or change, the MN also sends an indication to the other NR PSCell target candidate(s) (i.e. those NR PSCells which was not triggered by the UE) so that they can release their resources and/or suspend any other related operation. That could be done with a Conditional NR PSCell addition or change cancelling message or equivalent indication. After random access (step 6), the UE continues the communication with the SN as a legacy SN addition or change e.g. NR PSCell addition or change procedure, according to NR specifications.

Some embodiments herein also comprise a third enhancement. Upon reception of an RRCReconfiguration (e.g. via Signaling Radio Bearer #1 (SRB1), and via NR MCG) including conditional NR PSCell configuration (e.g. execution/trigger conditions equivalent to an event A3/A5/A4, for a measurement object associated to an SSB frequency/ARFCN X), the UE performs the following actions. The UE determines if execution/trigger conditions associated to at least one NR PSCell candidate target cell for NR PSCell addition or change in the configuration have been fulfilled.

If the UE determines that the execution/trigger conditions have not been fulfilled for ANY of the NR PSCell candidate target cells for NR PSCell addition or change in the configuration, the UE sets the content of the complete message to be transmitted to the MN (e.g. RRCReconfigurationComplete) without including any MR-DC related response (e.g. an acknowledgement that the UE has been configured with SN terminated bearers and/or an SCG configuration, like not including an nr-SCG-Response within scg-Response). The UE is not considered to be in NR-DC operation i.e. it does NOT transfer the RRCReconfigurationComplete message via SRB1 embedded in NR RRC message RRCReconfigurationComplete; Instead, it submits the RRCConnectionReconfigurationComplete message to lower layers for transmission using the new configuration, upon which the procedure ends.

Else, If the UE determines that the execution/trigger conditions associated to at least one NR PSCell candidate target cell for NR PSCell addition or change in the configuration have been fulfilled, the UE sends a single complete message including an MR-DC related indication (like the nr-SCG-Response within scg-Response). The UE does this instead of transmitting a first complete message to acknowledge the reception of the configuration and, upon verifying the fulfilment of the execution conditions sending a second message (this time possibly including an MR-DC related indication (like the nr-SCG-Response within scg-Response).

One embodiment, equivalent to how this can be modelled in the RRC specifications (e.g. NR TS 3.331) is the following. Upon reception of conditional NR PSCell addition or change configurations, and upon determining that the execution conditions have been fulfilled to at least one target candidate NR cell, the UE aborts the transmission of the first acknowledgement message (RRCReconfigurationComplete). As the conditions are fulfilled for at least one cell, the procedure will be called but (but associated to another message, the one provided in a container and containing MR-DC configurations) and transmission of the complete message will be called and the content of the complete message should be set (including MR-DC related configurations, like the nr-SCG-Response) and the message transmitted.

One case could occur, which is if the stored message containing target's candidate configuration contains in itself conditional reconfigurations that is fulfilled upon conditional reconfiguration execution. In that case, the complete message can also be aborted until the execution of the follow up message occurs, so the complete message is finally transmitted.

Below is shown a possible change to TS 38.331 for conditional NR-DC configuration.

5.3.5.3 Reception Of An Rrcreconfiguration By The UE

The UE shall perform the following actions upon reception of the RRCReconfiguration or upon applying a stored RRCReconfiguration message upon conditional reconfiguration execution:

[ . . . ]

1> if the RRCReconfiguration message includes the conditionalReconfiguration:
  2> perform conditional reconfiguration as specified in 5.3.5.x;
  2> if as an outcome of 5.3.5.x execution/triggering conditions are fulfilled for at least one cell:
    3> the procedure ends;
1> set the content of RRCReconfigurationComplete message as follows:
Editor's Note: FFS Whether we need an exception to the transmission of the RRCReconfigurationComplete message i.e. not transmit if only conditional reconfiguration is included in the message.
Editor's Note: FFS Whether we need an exception to the transmission of the RRCReconfigurationComplete message i.e. not transmit in case the message contains CHO configuration and upon reception a trigger condition is fulfilled.
  2> if the received RRCReconfiguration message includes the mrdc-SecondaryCellGroupConfig with mrdc-SecondaryCellGroup set to eutra-SCG:
    3> include eutra-SCG-Response within scg-Response in accordance with TS 36.331 [10] clause 5.3.5.3;
  2> if the received RRCReconfiguration message includes the mrdc-SecondaryCellGroupConfig with mrdc-SecondaryCellGroup set to nr-SCG:
    3> include nr-SCG-Response within scg-Response;
1> if the UE is configured with E-UTRA nr-SecondaryCellGroupConfig (MCG is E-UTRA):
  2> if RRCReconfiguration was received via SRB1:
    3> submit the RRCReconfigurationComplete via the E-UTRA MCG embedded in E-UTRA RRC message RRCConnectionReconfigurationComplete as specified in TS 36.331 [10];
    3> if reconfigurationWithSync was included in spCellConfig of an SCG:
      4> initiate the Random Access procedure on the SpCell, as specified in TS 38.321 [3];
    3> else:
      4> the procedure ends;
1 NOTE 1: The order the UE sends the RRCConnectionReconfigurationComplete message and performs the Random Access procedure towards the SCG is left to UE implementation.
  2> else (RRCReconfiguration was received via SRB3):
    3> submit the RRCReconfigurationComplete message via SRB3 to lower layers for transmission using the new configuration;
1> else if RRCReconfiguration message was received within the nr-SCG within mrdc-SecondaryCellGroup (NR SCG RRC Reconfiguration):
  2> if reconfigurationWithSync was included in spCellConfig in nr-SCG:
    3> initiate the Random Access procedure on the PSCell, as specified in TS 38.321 [3];
  2> else
    3> the procedure ends;
1> else if RRCReconfiguration was received via SRB3:
  2> submit the RRCReconfigurationComplete message via SRB3 to lower layers for transmission using the new configuration;
1> else (MCG RRCReconfiguration i.e. message received on SRB1 via the NR MCG):
  2> submit the RRCReconfigurationComplete message via SRB1 to lower layers for transmission using the new configuration;
  2> if this is the first RRCReconfiguration message after successful completion of the RRC re-establishment procedure:
    3> resume SRB2 and DRBs that are suspended;
[ . . . ]

As in the EN-DC case, for the TS 36.331, another alternative is to model the trigger for aborting the transmission of the complete message with a UE variable, that indicates whether the complete message is to be transmitted or not according to the conditions described in the method above.

Some embodiments also comprises a fourth enhancement. Upon reception of an RRCReconfiguration including conditional NR PSCell configuration (e.g. execution/trigger conditions equivalent to an event A3/A5/A4, for a measurement object associated to an SSB frequency/ARFCN X), the UE decodes the execution/trigger conditions, and perform the following actions. The UE determines if the message includes or not source's configuration e.g. at least one field related to source configuration that is not conditionalReconfiguration.

If the UE determines that the message includes source's configuration e.g. at least one field related to source configuration that is not conditionalReconfiguration, the UE transmits a complete message in response to the configuration. If the UE determines that the message does not include source's configuration e.g. at least one field related to source configuration (only conditional PSCell addition or change configuration), the UE does not transmit a complete message in response to the configuration.

Below is shown a possible change to TS 38.331 for conditional NR-DC configuration where that fourth enhancement is implemented:

5.3.5.3 Reception Of An Rrcreconfiguration By The UE

The UE shall perform the following actions upon reception of the RRCReconfiguration or upon applying a stored RRCReconfiguration message upon conditional reconfiguration execution:

[ . . . ]

1> if the RRCReconfiguration message includes the conditionalReconfiguration:
  2> perform conditional reconfiguration as specified in 5.3.5.x;
  2> if the received RRCReconfiguration does not include source's configuration (i.e. only incliudes conditionalReconfiguration; or
    3> the procedure ends;
1> set the content of RRCReconfigurationComplete message as follows:
Editor's Note: FFS Whether we need an exception to the transmission of the RRCReconfigurationComplete message i.e. not transmit if only conditional reconfiguration is included in the message.
Editor's Note: FFS Whether we need an exception to the transmission of the RRCReconfigurationComplete message i.e. not transmit in case the message contains CHO configuration and upon reception a trigger condition is fulfilled.
>> if the received RRCReconfiguration message includes the mrdc-SecondaryCellGroupConfig with mrdc-SecondaryCellGroup set to eutra-SCG:
>>> include eutra-SCG-Response within scg-Response in accordance with TS 36.331 [10] clause 5.3.5.3;
>> if the received RRCReconfiguration message includes the mrdc-SecondaryCellGroupConfig with mrdc-SecondaryCellGroup set to nr-SCG:
>>> include nr-SCG-Response within scg-Response;
> if the UE is configured with E-UTRA nr-SecondaryCellGroupConfig (MCG is E-UTRA):
>> if RRCReconfiguration was received via SRB1:
>>> submit the RRCReconfigurationComplete via the E-UTRA MCG embedded in E-UTRA RRC message RRCConnectionReconfigurationComplete as specified in TS 36.331 [10];
>>> if reconfigurationWithSync was included in spCellConfig of an SCG:
>>>> initiate the Random Access procedure on the SpCell, as specified in TS 38.321 [3];
>>> else:
>>>> the procedure ends;
2 NOTE 1: The order the UE sends the RRCConnectionReconfigurationComplete message and performs the Random Access procedure towards the SCG is left to UE implementation.
>> else (RRCReconfiguration was received via SRB3):
>>> submit the RRCReconfigurationComplete message via SRB3 to lower layers for transmission using the new configuration;
> else if RRCReconfiguration message was received within the nr-SCG within mrdc-SecondaryCellGroup (NR SCG RRC Reconfiguration):
>> if reconfigurationWithSync was included in spCellConfig in nr-SCG:
>>> initiate the Random Access procedure on the PSCell, as specified in TS 38.321 [3];
>> else
>>> the procedure ends;
> else if RRCReconfiguration was received via SRB3:
>> submit the RRCReconfigurationComplete message via SRB3 to lower layers for transmission using the new configuration;
> else (MCG RRCReconfiguration i.e. message received on SRB1 via the NR MCG):
>> submit the RRCReconfigurationComplete message via SRB1 to lower layers for transmission using the new configuration;
>> if this is the first RRCReconfiguration message after successful completion of the RRC re-establishment procedure:
>>> resume SRB2 and DRBs that are suspended;
[ . . . ]
Below is shown a possible change to TS 38.331 for conditional NR-DC configuration where both the third and the fourth enhancements are implemented:

5.3.5.3 Reception Of An Rrcreconfiguration By The UE

The UE shall perform the following actions upon reception of the RRCReconfiguration or upon applying a stored RRCReconfiguration message upon conditional reconfiguration execution:

[ . . . ]
> if the RRCReconfiguration message includes the conditionalReconfiguration:
>> perform conditional reconfiguration as specified in 5.3.5.x;
>> if as an outcome of 5.3.5.x execution/triggering conditions are fulfilled for at least one cell: or
>> if the received RRCReconfiguration does not include source's configuration (i.e. only includes conditionalReconfiguration:
>>> the procedure ends;
> set the content of RRCReconfigurationComplete message as follows:
Editor's Note: FFS Whether we need an exception to the transmission of the RRCReconfigurationComplete message i.e. not transmit if only conditional reconfiguration is included in the message.
Editor's Note: FFS Whether we need an exception to the transmission of the RRCReconfigurationComplete message i.e. not transmit in case the message contains CHO configuration and upon reception a trigger condition is fulfilled.
>> if the received RRCReconfiguration message includes the mrdc-SecondaryCellGroupConfig with mrdc-SecondaryCellGroup set to eutra-SCG:
>>> include eutra-SCG-Response within scg-Response in accordance with TS 36.331 [10] clause 5.3.5.3;
>> if the received RRCReconfiguration message includes the mrdc-SecondaryCellGroupConfig with mrdc-SecondaryCellGroup set to nr-SCG:
>>> include nr-SCG-Response within scg-Response;
> if the UE is configured with E-UTRA nr-SecondaryCellGroupConfig (MCG is E-UTRA):
>> if RRCReconfiguration was received via SRB1:
>>> submit the RRCReconfigurationComplete via the E-UTRA MCG embedded in E-UTRA RRC message RRCConnectionReconfigurationComplete as specified in TS 36.331 [10];
>>> if reconfigurationWithSync was included in spCellConfig of an SCG:
>>>> initiate the Random Access procedure on the SpCell, as specified in TS 38.321 [3];
>>> else:
>>>> the procedure ends;
3 NOTE 1: The order the UE sends the RRCConnectionReconfigurationComplete message and performs the Random Access procedure towards the SCG is left to UE implementation.
>> else (RRCReconfiguration was received via SRB3):
>>> submit the RRCReconfigurationComplete message via SRB3 to lower layers for transmission using the new configuration;
> else if RRCReconfiguration message was received within the nr-SCG within mrdc-SecondaryCellGroup (NR SCG RRC Reconfiguration):
>> if reconfigurationWithSync was included in spCellConfig in nr-SCG:
>>> initiate the Random Access procedure on the PSCell, as specified in TS 38.321 [3];
>> else
>>> the procedure ends;
> else if RRCReconfiguration was received via SRB3:
>> submit the RRCReconfigurationComplete message via SRB3 to lower layers for transmission using the new configuration;
> else (MCG RRCReconfiguration i.e. message received on SRB1 via the NR MCG):

2> submit the RRCReconfigurationComplete message via SRB1 to lower layers for transmission using the new configuration;
2> if this is the first RRCReconfiguration message after successful completion of the RRC re-establishment procedure:
3> resume SRB2 and DRBs that are suspended;
[ . . . ]

Below is shown a possible change to TS 36.331 for conditional EN-DC configuration where that enhancement to omit lower layer acknowledgement is implemented:

5.3.5.3 Reception Of An Rrcconnectionreconfiguration Not Including The Mobilitycontrolinfo By The UE If the RRCConnectionReconfiguration message does not include the mobilityControlInfo and the UE is able to comply with the configuration included in this message, the UE shall:
[ . . . ]
1> if the RRCConnectionReconfiguration message includes the conditionalReconfiguration:
2> perform conditional reconfiguration as specified in 5.3.5.x;
NOTE 1: The UE should perform the conditional reconfiguration as soon as possible following the fulfilment of the execution conditions of the conditional reconfiguration, which could be before confirming successful reception (HARQ and ARQ) of this message.
[ . . . ]

The description above has focused on conditional NR PSCell addition or change for a UE that is able to operate in NR-DC, but similar principles are equally applicable to other MR-DC configurations e.g. when LTE is MCG (connected to 5GC i.e. an NG-RAN gNB) and NR is SCG, or when NR is SCG and LTE is SCG.

Figure 12:
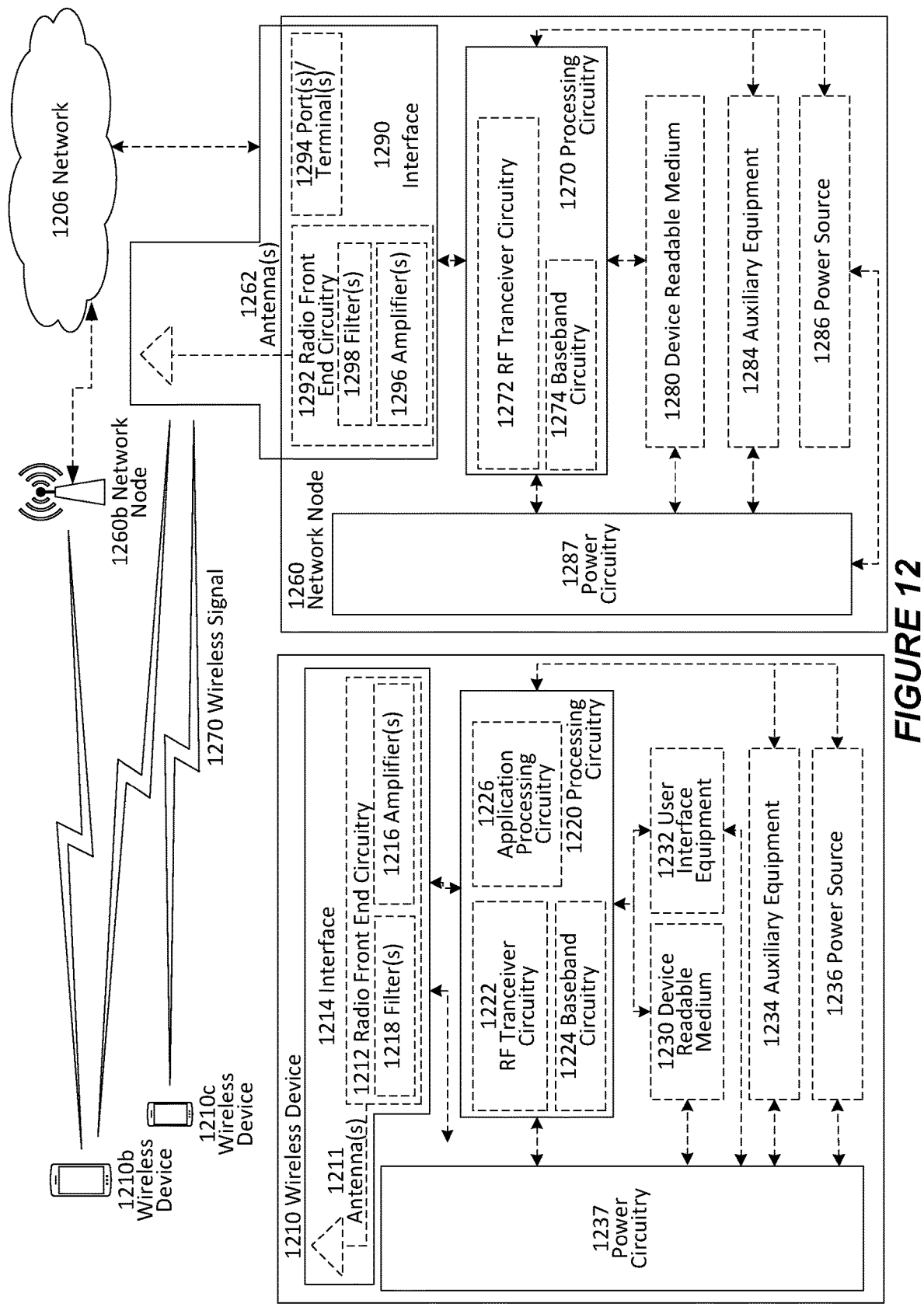
FIG. 12 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and WDs 1210, 1210b, and 1210c. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
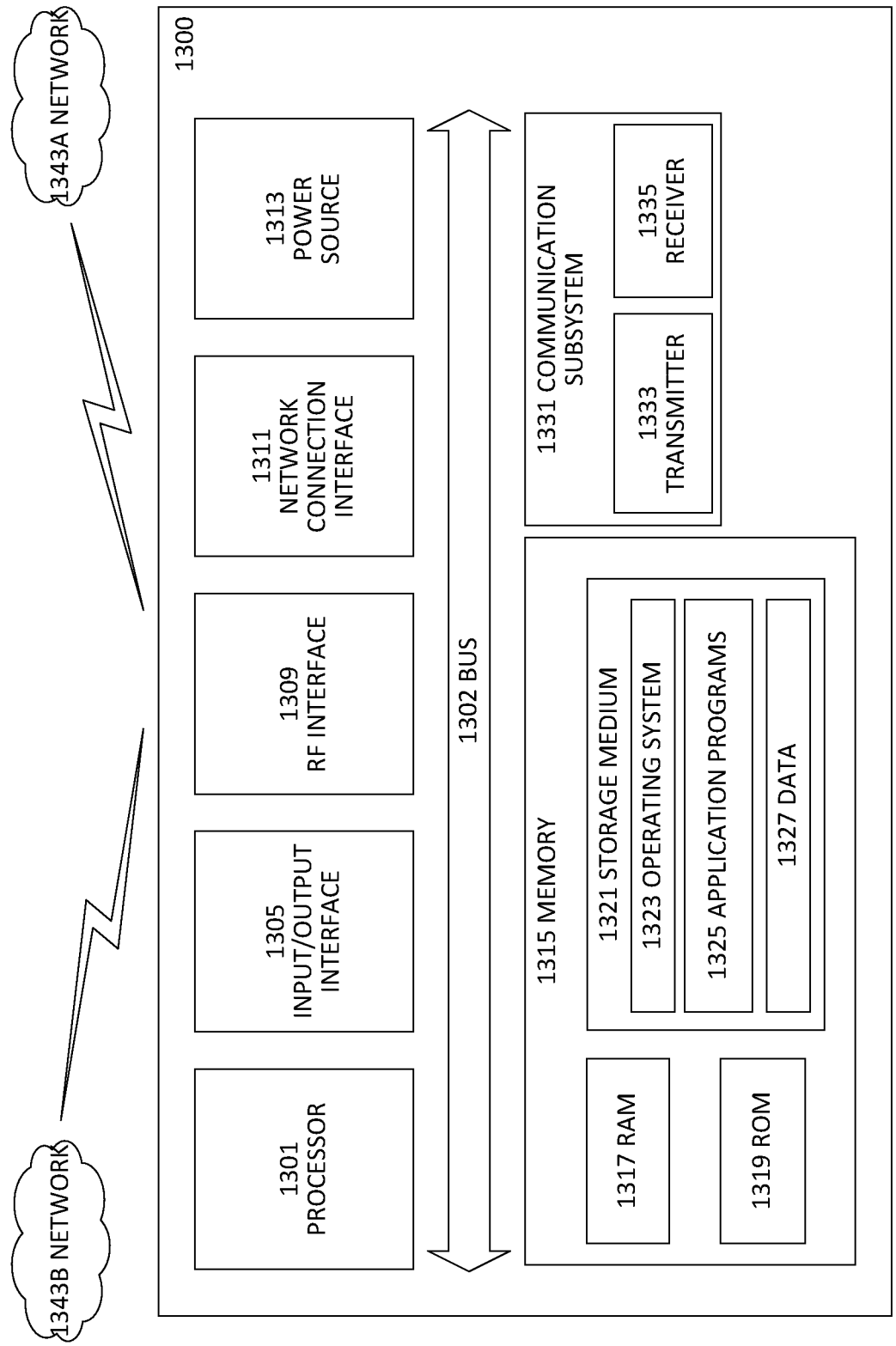
FIG. 13 is a block diagram of a user equipment according to some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the $3^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343a. Network 1343a may encompass wired and/or wireless networks such as a local-area network (LAN), a wide-area network (WAN), a computer network, a wireless network, a telecommunications network, another like network or any combination thereof. For example, network 1343a may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343b using communication subsystem 1331. Network 1343a and network 1343b may be the same network or networks or different network or networks. Communication subsystem 1331 may be configured to include one or more transceivers used to communicate with network 1343b. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343b may encompass wired and/or wireless networks such as a local-area network (LAN), a wide-area network (WAN), a computer network, a wireless network, a telecommunications network, another like network or any combination thereof. For example, network 1343b may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
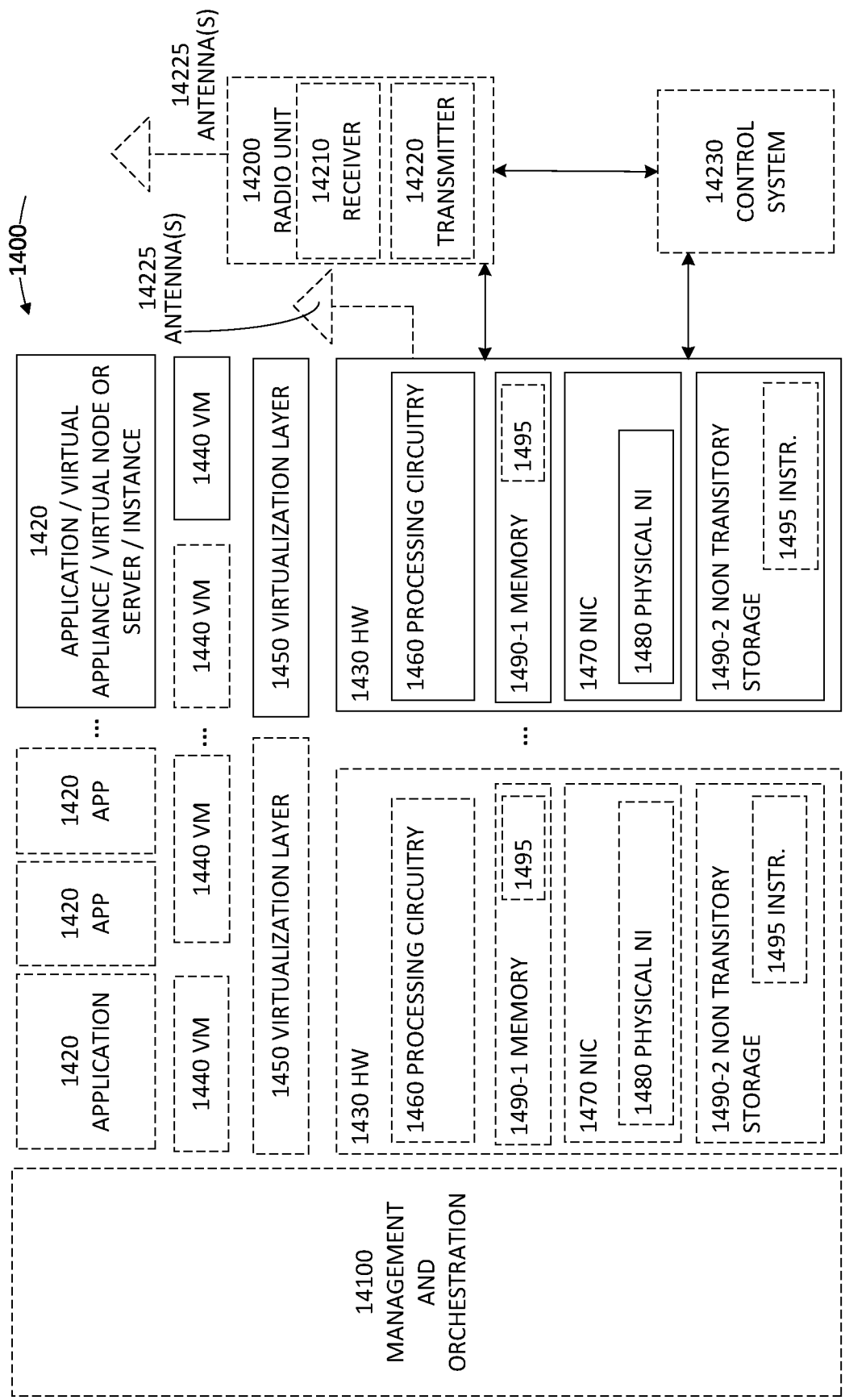
FIG. 14 is a block diagram of a virtualization environment according to some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
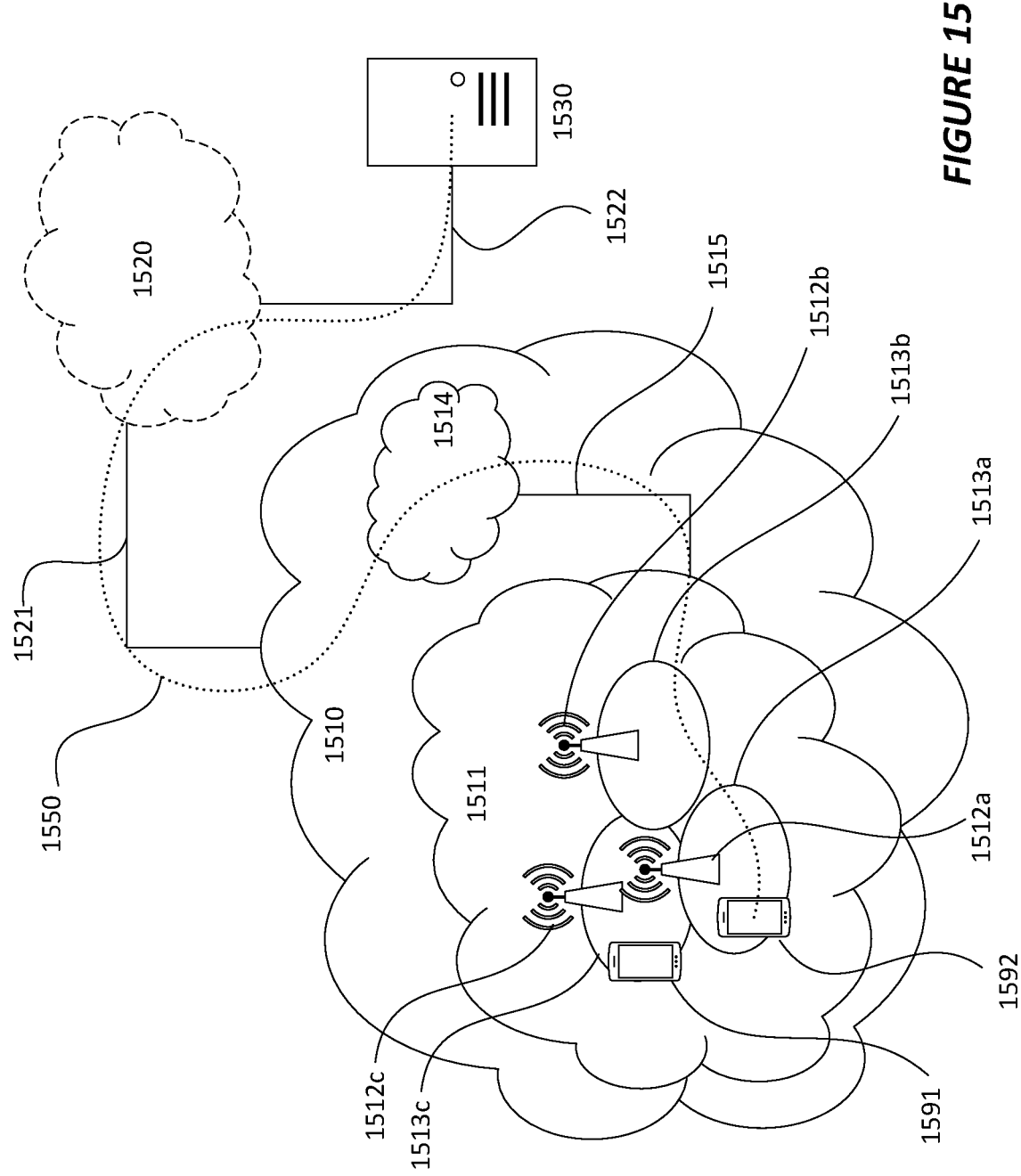
FIG. 15 is a block diagram of a communication network with a host computer according to some embodiments.

FIG. 15 illustrates a telecommunication network connected via an intermediate network to a host computer in accordance with some embodiments. In particular, with reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
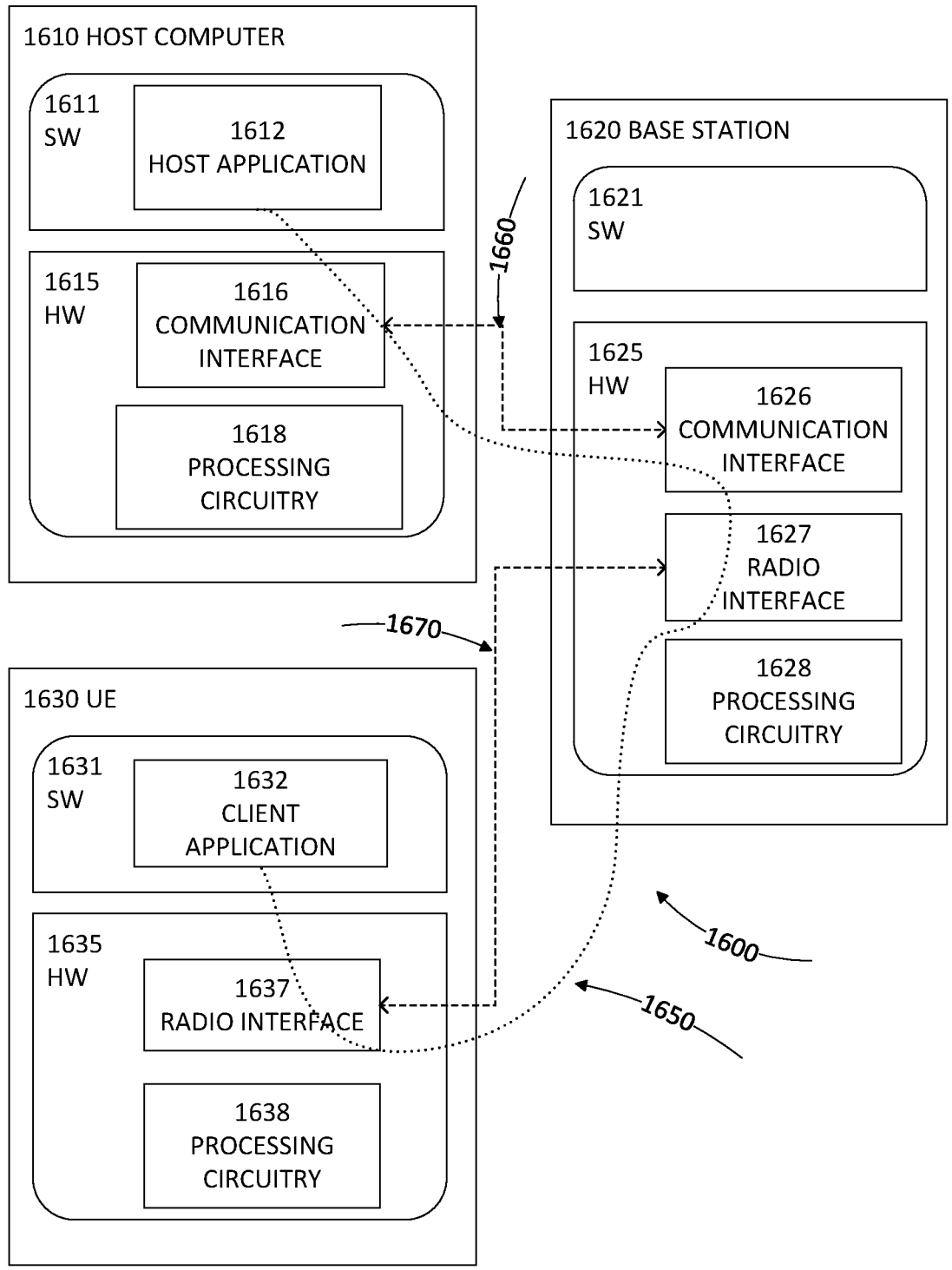
FIG. 16 is a block diagram of a host computer according to some embodiments.

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512a, 1512b, 1512c and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
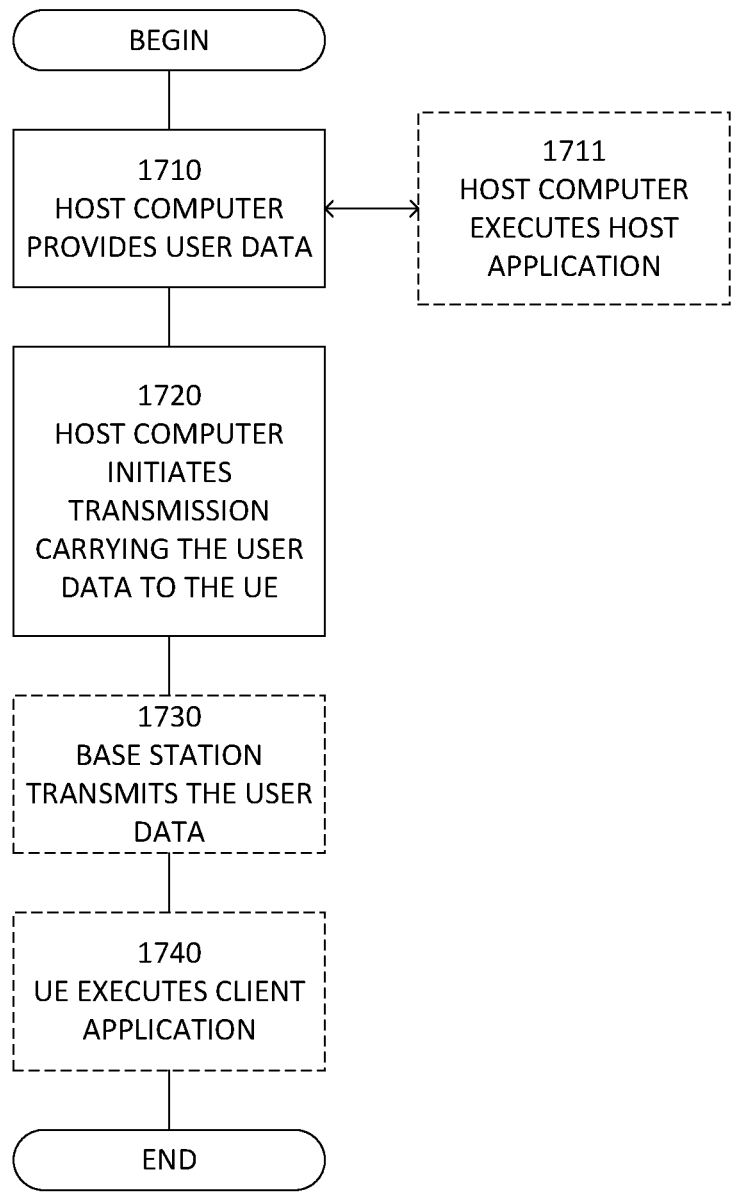
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
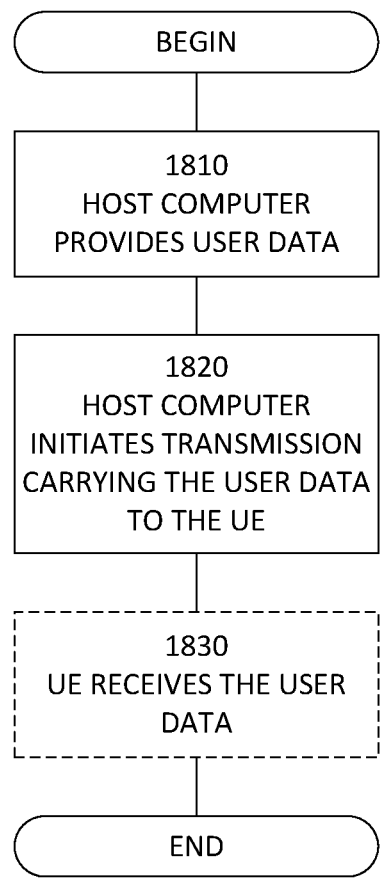
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
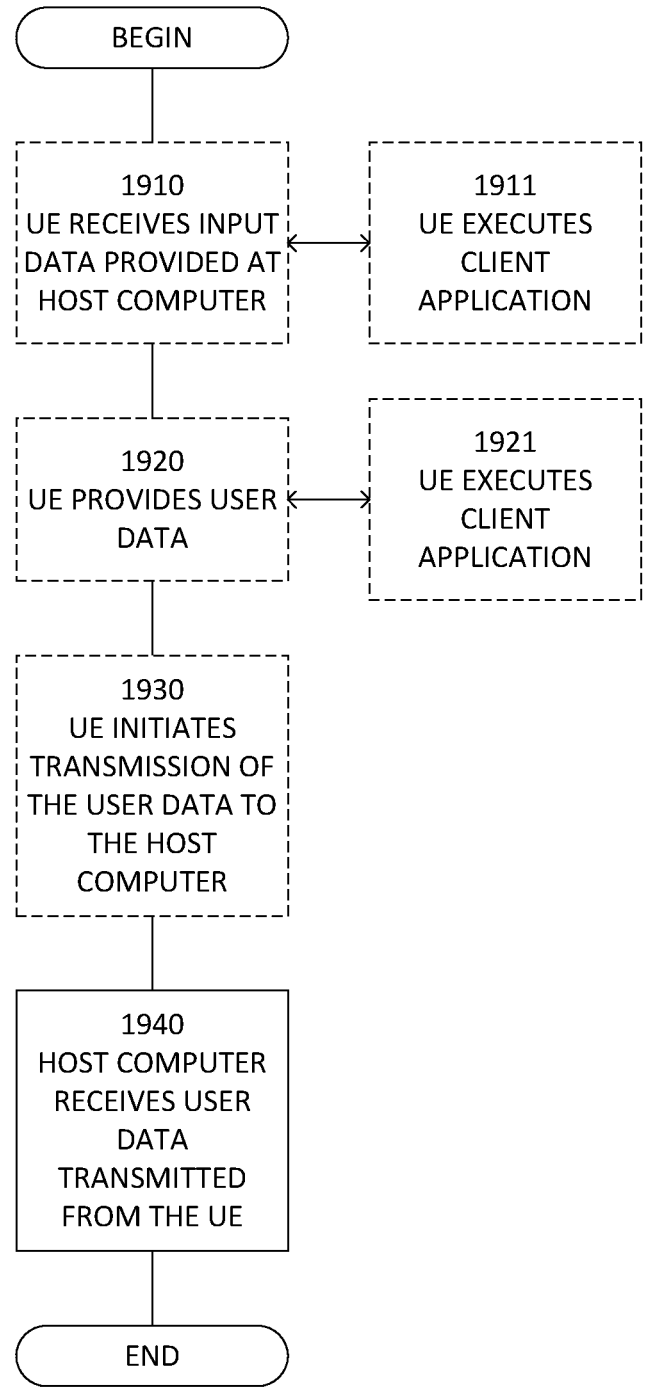
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
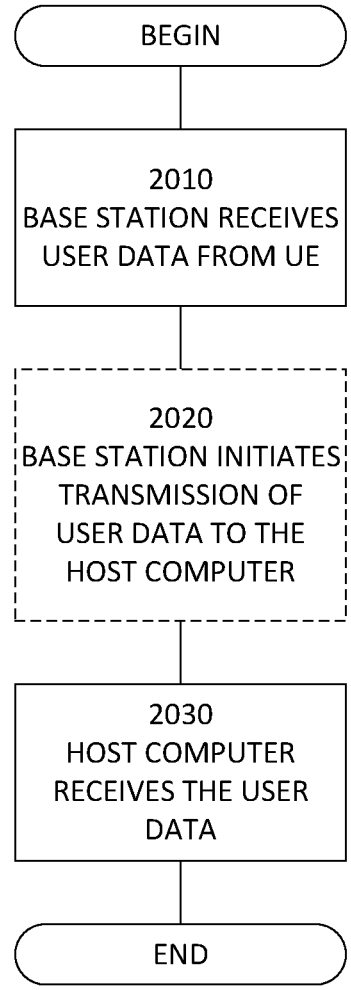
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
   receiving, from a master node for multi-connectivity operation, a configuration message which includes a master configuration and one or more conditional PSCell configurations, wherein the master configuration is associated with the master node, wherein each conditional PSCell configuration comprises a PSCell configuration that the wireless device is to apply when an associated condition is fulfilled, wherein each PSCell configuration is a configuration of a primary cell of a secondary cell group associated with a secondary node for multi-connectivity operation;
   transmitting a first message in response to the configuration message, wherein the first message indicates acknowledgement of receipt, applying of, and/or understanding of the master configuration; and
   after transmitting the first message, when the condition for applying the PSCell configuration of at least one of the one or more conditional PSCell configurations is fulfilled, transmitting, to the master node, a second message that includes an indication indicating application by the wireless device of the PSCell configuration of at least one of the one or more conditional PSCell configurations.

2. The method of claim 1, further comprising:
   responsive to receiving the configuration message, evaluating whether the condition for at least one of the one or more conditional PSCell configurations is fulfilled;
   identifying whether the configuration message includes the master configuration; and
   determining, based on said evaluating and said identifying, whether to transmit the first message in response to the configuration message;
   wherein, according to said determining, the first message is transmitted based on identifying that the configuration message includes the master configuration and based on evaluating that the condition has not been fulfilled for any of the one or more conditional PSCell configurations.

3. The method of claim 1, wherein the first message lacks Layer 2 acknowledgement of the configuration message.

4. The method of claim 1, wherein the first message is a first Radio Resource Control (RRC) Reconfiguration Complete message or a first RRC Connection Reconfiguration Complete message.

5. The method of claim 1, wherein the second message is a second Radio Resource Control (RRC) Reconfiguration Complete message or a second RRC Connection Reconfiguration Complete message.

6. The method of claim 1, wherein the indication indicates which PSCell configuration the wireless device has applied.

7. The method of claim 1, wherein each conditional PSCell configuration comprises either a conditional PSCell change configuration or a conditional PSCell addition configuration.

8. The method of claim 1, further comprising, when the condition for applying the PSCell configuration of at least one of the one or more conditional PSCell configurations is fulfilled, applying the PSCell configuration of at least one of the one or more conditional PSCell configurations, wherein the indication included in the second message indicates that the wireless device has applied the PSCell configuration of at least one of the one or more conditional PSCell configurations.

9. A method performed by a radio network node acting as a master node for multi-connectivity operation, the method comprising:
   transmitting, from the master node to a wireless device, a configuration message which includes a master configuration and one or more conditional PSCell configurations, wherein the master configuration is associated with the master node, wherein each conditional PSCell configuration comprises a PSCell configuration that the wireless device is to apply when an associated condition is fulfilled, wherein each PSCell configuration is a configuration of a primary cell of a secondary cell group associated with a secondary node for multi-connectivity operation;
   receiving, from the wireless device, a first message in response to the configuration message, wherein the first message indicates acknowledgement of the receipt, applying of, and/or understanding of the master configuration; and
   after receiving the first message, receiving, from the wireless device, a second message that includes an indication indicating application by the wireless device of the PSCell configuration of at least one of the one or more conditional PSCell configurations.

10. The method of claim 9, wherein the applied indication is not received until fulfillment of the condition for at least one of the one or more conditional PSCell configurations.

11. The method of claim 9, wherein the first message lacks Layer 2 acknowledgement of the configuration message.

12. The method of claim 9, wherein the first message is a first Radio Resource Control (RRC) Reconfiguration Complete message or a first RRC Connection Reconfiguration Complete message.

13. The method of claim 9, wherein the second message is a second Radio Resource Control (RRC) Reconfiguration Complete message or a second RRC Connection Reconfiguration Complete message.

14. The method of claim 9, wherein the applied indication indicates which PSCell configuration the wireless device has applied.

15. The method of claim 9, wherein each conditional PSCell configuration comprises either a conditional PSCell change configuration or a conditional PSCell addition configuration.

16. The method of claim 9, further comprising, responsive to receiving the second message including the indication indicating application by the wireless device of the PSCell configuration of at least one of the one or more conditional PSCell configurations, transmitting a message to a secondary node associated with a different one of the one or more conditional PSCell configurations whose PSCell configuration the wireless device has not applied, wherein the message indicates that the wireless device has not applied the PSCell configuration of the different one of the one or more conditional PSCell configurations and/or cancels the different one of the one or more conditional PSCell configurations.

17. The method of claim 9, further comprising forwarding the second message to a secondary node associated with the at least one of the one or more conditional PSCell configurations whose PSCell configuration is indicated by the applied indication as being applied by the wireless device.

18. A wireless device for multi-connectivity operation, the wireless device comprising:
  communication circuitry; and
  processing circuitry configured to:
    receive, from a master node for multi-connectivity operation, a configuration message which includes a master configuration and one or more conditional PSCell configurations, wherein the master configuration is associated with the master node, wherein each conditional PSCell configuration comprises a PSCell configuration that the wireless device is to apply when an associated condition is fulfilled, wherein each PSCell configuration is a configuration of a primary cell of a secondary cell group associated with a secondary node for multi-connectivity operation;
    transmit a first message in response to the configuration message, wherein the first message indicates acknowledgement of receipt, applying of, and/or understanding of the master configuration; and
    after transmitting the first message, when the condition for applying the PSCell configuration of at least one of the one or more conditional PSCell configurations is fulfilled, transmit, to the master node, a second message that includes an indication indicating application by the wireless device of the PSCell configuration of at least one of the one or more conditional PSCell configurations.

19. The wireless device of claim 18, the processing circuitry further configured to:
  responsive to receiving the configuration message, evaluate whether the condition for at least one of the one or more conditional PSCell configurations is fulfilled;
  identify whether the configuration message includes the master configuration; and
  determine, based on said evaluating and said identifying, whether to transmit the first message in response to the configuration message;
  wherein, according to determining whether to transmit the first message in response to the configuration message, the first message is transmitted based on identifying that the configuration message includes the master configuration and based on evaluating that the condition has not been fulfilled for any of the one or more conditional PSCell configurations.

20. The wireless device of claim 18, wherein the first message lacks Layer 2 acknowledgement of the configuration message.

21. The wireless device of claim 18, wherein the first message is a first Radio Resource Control (RRC) Reconfiguration Complete message or a first RRC Connection Reconfiguration Complete message.

22. The wireless device of claim 18, wherein the second message is a second Radio Resource Control (RRC) Reconfiguration Complete message or a second RRC Connection Reconfiguration Complete message.

23. The wireless device of claim 18, wherein the indication indicates which PSCell configuration the wireless device has applied.

24. The wireless device of claim 18, wherein each conditional PSCell configuration comprises either a conditional PSCell change configuration or a conditional PSCell addition configuration.

25. The wireless device of claim 18, the processing circuitry further configured to, when the condition for applying the PSCell configuration of at least one of the one or more conditional PSCell configurations is fulfilled, apply the PSCell configuration of at least one of the one or more conditional PSCell configurations, wherein the indication included in the second message indicates that the wireless device has applied the PSCell configuration of at least one of the one or more conditional PSCell configurations.

26. A radio network node configurable to act as a master node for multi-connectivity operation, the radio network node comprising:
  communication circuitry; and
  processing circuitry configured to:
    transmit, from the master node to a wireless device, a configuration message which includes a master configuration and one or more conditional PSCell configurations, wherein the master configuration is associated with the master node, wherein each conditional PSCell configuration comprises a PSCell configuration that the wireless device is to apply when an associated condition is fulfilled, wherein each PSCell configuration is a configuration of a primary cell of a secondary cell group associated with a secondary node for multi-connectivity operation;
    receive, from the wireless device, a first message in response to the configuration message, wherein the first message indicates acknowledgement of the receipt, applying of, and/or understanding of the master configuration; and
    after receiving the first message, receive, from the wireless device, a second message that includes an indication indicating application by the wireless device of the PSCell configuration of at least one of the one or more conditional PSCell configurations.

\* \* \* \* \*